Aug. 22, 1961 A. C. REYNOLDS, JR 2,997,702

SIGNAL GENERATING APPARATUS

Filed June 16, 1958 15 Sheets-Sheet 1

INVENTOR.
Andrew Craig Reynolds, Jr.
ATTORNEYS

Aug. 22, 1961 A. C. REYNOLDS, JR 2,997,702

SIGNAL GENERATING APPARATUS

Filed June 16, 1958 15 Sheets-Sheet 2

INVENTOR.
Andrew Craig Reynolds, Jr.
ATTORNEYS

Pennie, Edmonds, Morton, Barrows & Taylor

Aug. 22, 1961 A. C. REYNOLDS, JR 2,997,702

SIGNAL GENERATING APPARATUS

Filed June 16, 1958 15 Sheets-Sheet 3

*INVENTOR.*

Andrew Craig Reynolds, Jr.

*ATTORNEYS*

Pennie, Edmonds, Morton, Barrows & Taylor

Aug. 22, 1961 A. C. REYNOLDS, JR 2,997,702

SIGNAL GENERATING APPARATUS

Filed June 16, 1958 15 Sheets-Sheet 4

Power Supply Section

INVENTOR.
Andrew Craig Reynolds, Jr.
ATTORNEYS

Pennie, Edmonds, Morton, Barrows & Taylor

INVENTOR.
Andrew Craig Reynolds, Jr.
ATTORNEYS
Pennie, Edmonds, Morton, Barrows & Taylor Aug. 22, 1961 A. C. REYNOLDS, JR 2,997,702

SIGNAL GENERATING APPARATUS

Filed June 16, 1958 15 Sheets-Sheet 6

INVENTOR.
Andrew Craig Reynolds, Jr.

ATTORNEYS

Pennie, Edmonds, Morton, Barrows & Taylor

INVENTOR.
Andrew Craig Reynolds, Jr.
ATTORNEYS
Pennie, Edmonds, Morton, Barrows & Taylor Aug. 22, 1961 A. C. REYNOLDS, JR 2,997,702

SIGNAL GENERATING APPARATUS

Filed June 16, 1958 15 Sheets-Sheet 8

INVENTOR.

Andrew Craig Reynolds, Jr.

ATTORNEYS

Pennie, Edmonds, Morton, Barrows & Taylor

Aug. 22, 1961 A. C. REYNOLDS, JR 2,997,702

SIGNAL GENERATING APPARATUS

Filed June 16, 1958 15 Sheets-Sheet 9

INVENTOR.

Andrew Craig Reynolds, Jr.

ATTORNEYS

Pennie, Edmonds, Morton, Barrows & Taylor

Aug. 22, 1961 A. C. REYNOLDS, JR 2,997,702

SIGNAL GENERATING APPARATUS

Filed June 16, 1958 15 Sheets-Sheet 10

INVENTOR.

Andrew Craig Reynolds, Jr.

ATTORNEYS

Pennie, Edmonds, Morton, Barrows & Taylor

SIGNAL GENERATING APPARATUS

Filed June 16, 1958 15 Sheets-Sheet 11

INVENTOR.
Andrew Craig Reynolds, Jr.
ATTORNEYS
Pennie, Edmonds, Morton, Barrows & Taylor Aug. 22, 1961 A. C. REYNOLDS, JR 2,997,702

SIGNAL GENERATING APPARATUS

Filed June 16, 1958 15 Sheets-Sheet 12

INVENTOR.
Andrew Craig Reynolds, Jr.
ATTORNEYS

Pennie, Edmonds, Morton, Barrows & Taylor

Aug. 22, 1961 A. C. REYNOLDS, JR 2,997,702

SIGNAL GENERATING APPARATUS

Filed June 16, 1958 15 Sheets-Sheet 13

| Group No. Circuit No. | Break Cam A | B | C | D | E | Break Cam F | G | H | I | J | Make Cam A | B | C | D | E |
|---|---|---|---|---|---|---|---|---|---|---|---|---|---|---|---|
| 1 - 1 | ● | ● | ● | ● | ● | ● | | | | | | | | | |
| 1 - 2 | ● | ● | ● | ● | ● | | ● | | | | | | | | |
| 1 - 3 | ● | ● | ● | ● | ● | | | ● | | | | | | | |
| 1 - 4 | ● | ● | ● | ● | ● | | | | ● | | | | | | |
| 1 - 5 | ● | ● | ● | ● | ● | | | | | ● | | | | | |
| 3 - 1 | ● | ● | ● | | ● | ● | | | | | | | | ● | |
| 3 - 2 | ● | ● | ● | | ● | | ● | | | | | | | ● | |
| 3 - 3 | ● | ● | ● | | ● | | | ● | | | | | | ● | |
| 3 - 4 | ● | ● | ● | | ● | | | | ● | | | | | ● | |
| 3 - 5 | ● | ● | ● | | ● | | | | | ● | | | | ● | |
| 32 - 1 | | | | | | ● | | | | | ● | ● | ● | ● | ● |
| 32 - 2 | | | | | | | ● | | | | ● | ● | ● | ● | ● |
| 32 - 3 | | | | | | | | ● | | | ● | ● | ● | ● | ● |
| 32 - 4 | | | | | | | | | ● | | ● | ● | ● | ● | ● |
| 32 - 5 | | | | | | | | | | ● | ● | ● | ● | ● | ● |

*INVENTOR.*
Andrew Craig Reynolds, Jr.

*ATTORNEYS*

Pennie, Edmonds, Morton, Barrows & Taylor

Aug. 22, 1961 A. C. REYNOLDS, JR 2,997,702

SIGNAL GENERATING APPARATUS

Filed June 16, 1958 15 Sheets-Sheet 14

INVENTOR.

Andrew Craig Reynolds, Jr.

ATTORNEYS

Pennie, Edmonds, Morton, Barrows & Taylor

Aug. 22, 1961 A. C. REYNOLDS, JR 2,997,702

SIGNAL GENERATING APPARATUS

Filed June 16, 1958 15 Sheets-Sheet 15

*INVENTOR.*

Andrew Craig Reynolds, Jr.

*ATTORNEYS*

Pennie, Edmonds, Morton, Barrows & Taylor

United States Patent Office 2,997,702 Patented Aug. 22, 1961

2,997,702
SIGNAL GENERATING APPARATUS

Andrew Craig Reynolds, Jr., Waterbury, Conn., assignor to General Time Corporation, New York, N.Y., a corporation of Delaware Filed June 16, 1958, Ser. No. 742,333
33 Claims. (Cl. 340—309.1)

This invention relates to electrical signalling systems, and more particularly to a code pulse generator for the supply of pulse coded signals to receiver relays which control the operation of load devices. The apparatus of the invention permits the establishment of a program of such signals to control the operation of a large number of load devices in a desired sequence over a substantial period of time of the order of hours or days. For example, the present invention provides a centralized control by means of which the lights, bells and the heating and ventilating and other utility schedules in a large public school can be controlled according to a pre-established program, with one schedule for certain days of the week and other schedules for other days of the week. The program system of the invention also includes means whereby the pre-established program may be overridden by manually inserted signals. The signals are distributed over some form of transmission line, for example a single phase alternating current lighting circuit to which all of the load devices are connected through suitable signal detecting and discriminating devices so that the various load devices respond to a selected signal or signals and to no others.

In the accompanying drawings:

FIGS. 1*a* to 1L (hereinafter sometimes referred to collectively as FIG. 1) are a schematic diagram of one embodiment of the signal programming and generating apparatus of the invention;

FIG. 1*m* is a diagram showing the positional relationship to each other of FIGS. 1*a* to 1L;

The apparatus of FIG. 1 permits the generation of any one of a large number of different pulse code signals at any one of a succession of consecutive time intervals within a longer time interval, and provides for the scheduling of such signals in advance and their automatic generation at the desired times. For example, the short time intervals may be of one minute each, the apparatus scheduling a signal at any minute or minutes of a twenty-four hour period. Certain of the signals so scheduled may be made effective, for actual generation and transmission, in selected twelve hour (or other longer) periods, while other combinations of the signals scheduled are arranged to be transmitted during other twelve hour periods. The total time cycle for the apparatus may thus conveniently be made of seven days for example.

Figures 2, 5:
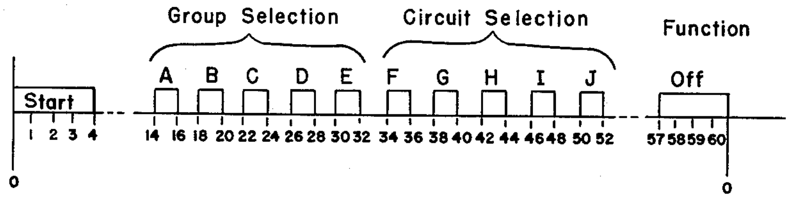
FIG. 2 is a diagram illustrating the nature of the pulse code system employed in the apparatus of FIG. 1.
FIG. 5 is a diagram illustrating a few of the pulse code combinations which make up the various signals generated by the apparatus of FIG. 1.

The signals generated may be understood with reference to FIGS. 2 and 5.

FIG. 2 is a diagram of voltage against time, and shows the nature of the coded pulse signals employed. All signals occupy the same signal time interval which may for example be of one minute, as shown in FIG. 2. All include a start pulse, which may for example be some three or four seconds long, and one or more of a plurality of signal identification pulses. The plurality, in the example illustrated is ten in number, identified as pulses A to J. The signals include or omit, according to their nature, a so-called function determining pulse identified in the figure by the legend "Off."

The code pulses A to J are of specified length and duration, and each, when present, occupies a predetermined position in the signal time interval, which is completed with the time allotted to the "Off" pulse. Two signals differing only in the presence and absence of the "Off" pulse actuate the same load devices, but serve respectively to change their state of operation in opposite senses, for example from on to off and from off to on, so that a load device may be turned off by a signal including an Off pulse and is turned on by a signal not including an Off pulse.

In a preferred embodiment of the invention to be described in detail, the coded pulses or pulse intervals A to J are distinguishable into two groups. The total number may be of any value, ten being shown in the system illustrated. These are divided into what may be called "group selection" pulses and "circuit selection" pulses. FIG. 2 shows the ten code pulse intervals equally divided between group selection and circuit selection pulses, but any other division may be adopted instead.

The characteristic feature of the group selection pulses is that the absence of a pulse, at the time of any one thereof, identifies a signal different from a signal otherwise the same but including a pulse at such time. By this is meant that a load device which, by operation of its associated signal detecting device, called a coded relay, would respond to a signal not including that particular group selection pulse will not respond to a signal otherwise the same but which does include that particular group selection pulse.

The same load device, responsive via its coded relay to a signal including a particular combination of group selection pulses (and no others) and a particular circuit selection pulse (and no others) will, on the other hand respond, in the same way, to another signal which differs only in that it includes one or more additional circuit selection pulses.

The pulses generated by the apparatus of the invention are typically pulses of A.-C. voltage at power line frequency, although they may of course be of any other frequency including direct current, and the apparatus illustrated in FIG. 1 includes means whereby the pulses may be generated in any one of a plurality of frequencies. For each such "carrier" frequency the pulse code of FIG. 2 provides a number of discriminable signals (apart the distinction between on and off signals determined by the absence or presence of the Off pulse) given by the number of circuit selection pulse positions times two to the exponent given by the number of group selection pulse positions. Thus with five of each, the number of discriminable signals for each carrier frequency is five times two to the fifth power, or one hundred and sixty.

Before proceeding to a description of the invention itself, an embodiment of which is illustrated in FIG. 1, it will be informative to describe the devices which are controlled by, and which discriminate among, the various signals of the general form of FIG. 2.

Figure 3:
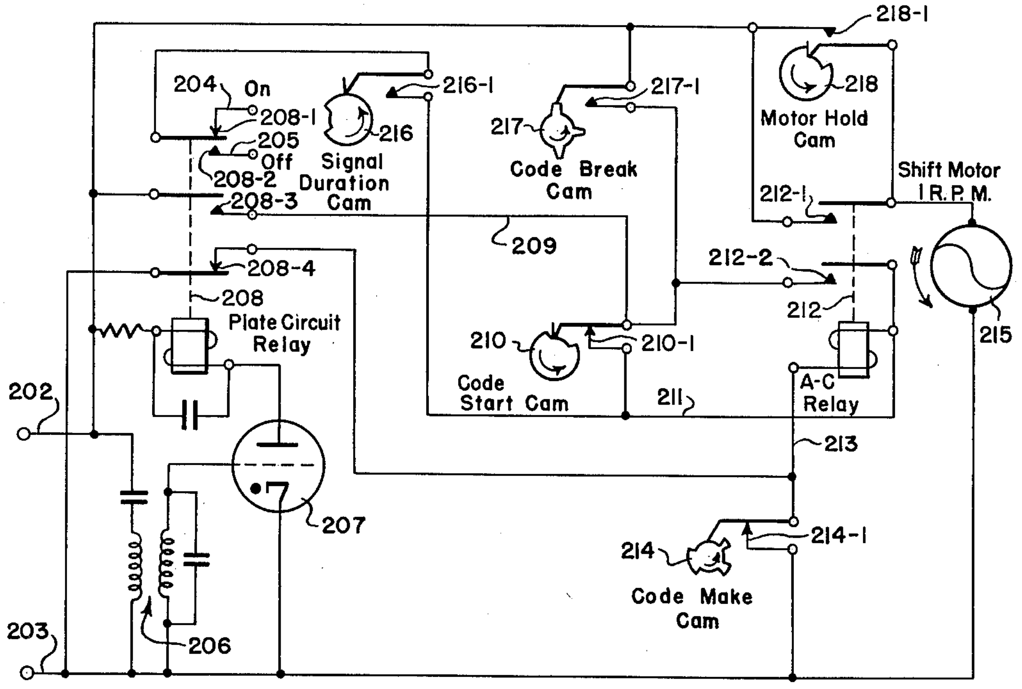
FIG. 3 is a diagram of a binary dual coded relay useable with the apparatus of FIG. 1 as a receiving device for controlling the operation of a load device in response to particular signals generated by the apparatus of FIG. 1 and selected by that relay.

FIG. 3 is a diagram of one form of pulse detecting or discriminating device operable by means of the invention to energize, in response to the signals for which it is coded, either an "on" conductor or an "off" conductor. These conductors may effect the actual turning on or off of a useful load device by means of the motor driven relay device of FIG. 4.

FIG. 3 illustrates what may be called a binary dual coded relay. This device responds to coded pulse signals of the type illustrated in FIG. 2 when of a selected carrier frequency. It will provide an output signal by energization of one of its output conductors 204 and 205, to signals of that carrier frequency containing a particular combination of the pulses A to E (and no other of those pulses A to E) and containing a particular one of the pulses F to J (whether other of the pulses F to J are present or not).

The pulsed signals in the form of pulses of an audio frequency arrive via the power line comprising conductors 202 and 203, the latter of which may be grounded. This power line supplies power for actuation of the mechanism of FIG. 3. It is to be understood that a multiplicity of devices of the type shown in FIG. 3 are connected to the same power line 202—203. This multiplicity may include as many as one hundred and sixty, for the example described of ten code pulses divided into five group selection and five circuit selection pulses. Indeed it may include a multiple of one hundred and sixty, if the pulse signals are applied to the power line in plural carrier frequencies, the devices according to FIG. 3 of each such multiple responding only to pulse signals in a particular carrier frequency.

To exclude pulsed signals of other than a single carrier frequency, the incoming pulses are passed through a filter generally indicated at 206 before being applied to the control grid of a gas controlled discharge tube 207, of the type commonly known as a thyratron. This tube has in its plate circuit the coil of an electromagnetic relay 208. The start pulse of every signal of the frequency to which fitler 206 is tuned will energize relay 208. Closing of its normally open contacts 208–3 applies power from conductor 202, via conductor 209, via closed contact 210–1 of a cam 210 and via conductor 211 to the coil of a "memory" relay 212, whose circuit is completed to conductor 203 via conductor 213 and closed contact 214–1 of a cam 214.

Energization of relay 212 establishes for it a holding circuit at normally open contact 212–2. By closing of contact 212–1, it also completes a circuit between conductors 202 and 203 for a motor 215. This motor, a so-called "shift motor," is a synchronous motor with an associated gear train giving an output shaft speed of one r.p.m., and this output shaft is coupled at unity drive ratio to the cams 210, 214, referred to as the "code start" and "code make" cam, and also to "signal duration," "code break" and "motor hold" cams 216, 217 and 218. The cams are shown in the figure in their "reset" position, which they occupy when the motor is de-energized.

Motor hold cam 218 controls normally open contact 218–1, the cam being so cut and phased that the contact is open from reset position of motor 215 in which it starts until a time prior to the end of the start pulse. Thus all binary coded relays of the type shown in FIG. 3 tuned to the same carrier frequency will respond to the start pulse in each coded signal of that frequency applied thereto to the extent of effecting energization of their shift motors 215, and these shift motors will operate for a full one minute interval by completion of a circuit therefor at their motor hold cams.

The code start cam 210 is so cut and phased as to open its associated contact 210–1 just after the end of the start pulse which initiated rotation of that cam.

The code break cam 217 is provided with a tooth as shown in the drawing initially holding open the associated contact 217–1, but this tooth is cut and phased so that contact 217–1 closes just prior to the end of the start pulse. The code break cam is provided with additional teeth phased for the time positions of each of the pulses in the series A to J required to be present in the code to which the relay of FIG. 3 in question is to be responsive. In practice these teeth are slightly narrower in their effective time duration than the code pulses A to J.

The code make cam 214 leaves its associated contact 214–1 closed during the start pulse and possesses teeth phased only for those of the pulses A to E required to be absent in the code signal to which the relay of FIG. 3 including such code make cam is to be responsive.

The signal duration cam 216 holds open its associated contact 216–1 at all times except the time of the signal duration or Off pulse at the end of the signal cycle of FIG. 2, the contact 216–1 being permitted to close just after the beginning of the Off pulse.

The operation of the relay of FIG. 3 may now be explained. Assume the relay is built to respond to the signal A B C $\overline{D}$ $\overline{E}$ F, by which notation is meant a signal including pulses A B C and F and not including pulses D or E.

Assuming application to conductors 202 and 203 of pulses of the carrier frequency which can pass through filter 206, the start pulse which is included in every pulse sequence will, as already described, energize memory relay 212, provide a holding circuit therefor, and start motor 215. Since the relay is to respond to the code A B C $\overline{D}$ $\overline{E}$ F, code break cam 217 possesses teeth at the times of pulses A B C and F and the code make cam 214 possesses teeth at the times of pulses D and E. At the end of the start pulse tube 207 goes out and relay 208 returns to de-energized condition. Motor 215 however is held energized after the end of the start pulse by closing of contact 218–1 and relay 212 is held energized by closing of contacts 217–1 on cams 217 and 212–2 on relay 212, contact 214–1 on cam 214 remaining closed until time for pulse D. At the times of each of the pulses A B and C, tube 207 fires again so that the circuit for relay 212 though opened during each of those pulses at contact 217–1 by teeth on cam 217, is saved at contact 208–3.

During each of the pulse periods D and E, contact 214–1 is opened by a tooth on cam 214, so that a signal including either of those pulses would, by opening contact 208–4, result in loss of the circuit for relay 212 between conductors 213 and 203.

Pulse F, by energizing the tube 207 and transferring relay 208, again saves the circuit for the memory relay 212 despite opening of contact 217–1 by a tooth on cam 217. Relay 212 is therefore held energized to the end of the minute code pulse cycle, a tooth on cam 217 opening the contact a fraction of a second prior to the end of that minute to insure an open condition of the contact upon the arrival of the next possible start pulse.

In order to permit the turning on or off of a plurality of separately discriminable load devices at one and the same time the code make cam 214 is not provided with teeth during any of the pulse periods F through J. In consequence the relay of FIG. 3 will respond to any signal conforming to the description A B C $\overline{D}$ $\overline{E}$ F, irrespective of the presence or absence of any one or more of the pulses G H I J. This is the physical foundation of the distinction between group selection and circuit selection pulses above discussed, a particular sequence of A to E pulses such as A B C $\overline{D}$ $\overline{E}$ identifying and controlling any one or more of a group of load devices or "circuits," according as the signal includes from one to five of the pulses F to J, in addition to the sequence A B C $\overline{D}$ $\overline{E}$.

If a signal of the form A B C $\overline{D}$ $\overline{E}$ F has been received by tube 207, relay 212 will be held energized for the full minute and there will despite opening of contact 210–1 be power on conductor 211 leading into contact 216–1 at the time of the Off pulse and this power will, by closing of cam 216, be passed to the outgoing conductor 205 or 204 according as the signal does or does not include an Off pulse.

Figure 4:
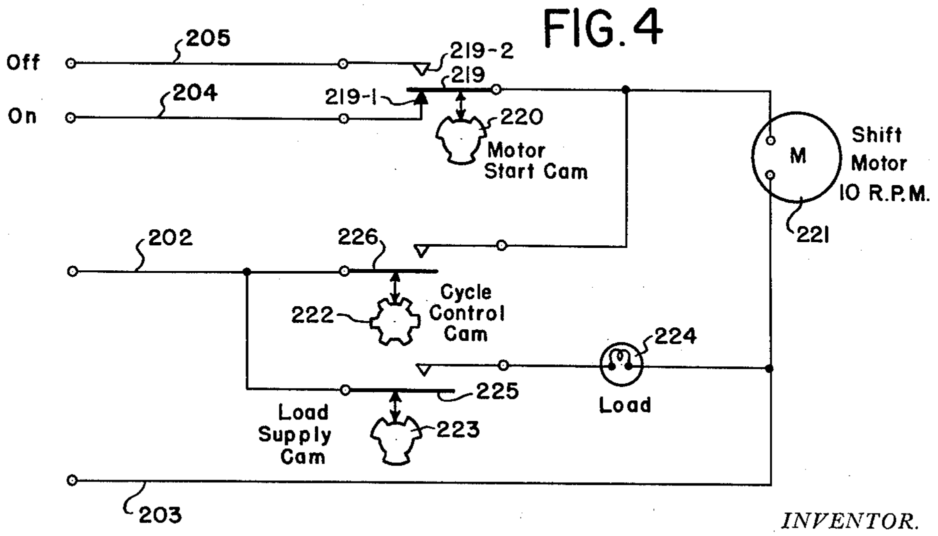
FIG. 4 is a diagram of a latching motor relay useable with the relay of FIG. 3 for direct control of power applied to a load device.

In one application of the invention the actual load device is controlled from the binary dual coded relay of FIG. 3 through a latching motor relay schematically illustrated in FIG. 4. In FIG. 4 conductors 204 and 205 of FIG. 3 lead to the contacts 219–1 and 219–2 of a switch 219 driven by a cam 220 coupled to a shift motor 221. This motor is also of low speed having an output shaft speed for example of 10 r.p.m. In addition to the cam 220 there are coupled to the motor 221 a cycle control cam 222 and a load supply cam 223. The load device itself is illustrated at 224.

Cam 222 has twice as many teeth as cams 220 and 223, and the three cams are coupled together at unity drive ratio. On each cam the teeth and the notches between teeth have the same angular width.

For one revolution of the output shaft of motor 221 the cams 220 and 223 shift their associated switches 219 and 225 from one to the other of the positions shown therefor, whereas during such a revolution the cycle control cam 222 first closes and then reopens its associated switch 226.

Assume that on the last cycle of operation of shift motor 221 switch 219 was left connected to contact 219–1 and conductor 204. This corresponds to an "off" condition of the load, as indicated by the open condition of switch 225, switch 226 being open also. The latching motor relay of the FIG. 4 will accordingly respond now to an "on" signal only. That is to say, the signal pattern made up of pulses illustrated in FIG. 2 must not include an Off pulse. If it does not, the binary coded relay of FIG. 3 will, upon receiving a proper signal such as that including the code A B C $\bar{D}$ $\bar{E}$ F in the example just discussed, apply power at the end of the minute interval to conductor 204. This will energize the shift motor 221 in FIG. 4. Before switch 219 in FIG. 4 is transferred to the de-energized Off conductor 205 the cycle control cam 222 will have provided motor 221 with a substitute energizing line directly at conductor 202 so that that motor can complete its cycle of operation, transferring switch 219 to the Off line 205 and closing the switch 225 by means of the load supply cam 223. Shift motor 221 is then turned off by the cycle control cam 222, opening the connection between conductor 202 and the shift motor.

The result of application of the signal A B C $\bar{D}$ $\bar{E}$ F (with or without any of the pulses G H I and J) has thus been to apply power to the load device 224 and to leave switch 219 connected to the Off conductor 205. The state of operation of load device 224 can now be changed only by application to the binary relay of FIG. 3 of a signal, of appropriate carrier frequency, including not only the start pulses but the coded pulses A B C $\bar{E}$ $\bar{D}$ F and an Off pulse.

FIG. 5 illustrates the makeup of the code break and code make cams of the various binary coded relays of the type illustrated in FIG. 3 which can be keyed by means of code pulse signals of the general type indicated in FIG. 2. It thus indicates the nature of those signals themselves. The signals, and the corresponding cam patterns, are advantageously grouped by groups each of which includes all signals having the same patterns of "group recognition" pulses A to E, i.e. pulses which must be present, with no extras, to permit perception in the coded relays of the type illustrated in FIG. 3, of the temporally succeeding "circuit selection" pulses F to J. Since there are, in the example under consideration, five different circuit selection pulses, there are five signals in each group. The first group is that including selection pulses A B C D E. The second group (not illustrated) includes group selection pulses A B C D $\bar{E}$. The third, which is illustrated, includes group selection pulses A B C $\bar{D}$ E, and so on, to the thirty-second, which includes group selection pulses $\bar{A}$ $\bar{B}$ $\bar{C}$ $\bar{D}$ $\bar{E}$. The pattern of teeth on the code break and code make cams 217 and 214 of the binary dual coded relays of the type shown in FIG. 3 is correspondingly illustrated in FIG. 5, where a dot represents a tooth.

Referring now to FIGS. 1*a* to 1L, there will be given a detailed description of a presently preferred embodiment of the invention. The pulses which make up the coded signals which have been discussed are generated in a transmitter or oscillator 1 shown in FIG. 1L. This transmitter is a device, known per se, including a plurality of input conductors 2, 4, 6 and 8 in the example illustrated, and a pair of output conductors designated 10 and 203, the latter being the grounded power conductor of FIG. 3. A large coupling capacitor 11 of low impedance at the audio carrier frequencies employed, couples conductor 10 with the other conductor 202 of the power line shown in FIG. 3.

Each of the input conductors 2, 4, 6 and 8 is arranged to supply to the transmitter 1, upon generation thereof by the remaining apparatus of FIGS. 1*a*–1L, pulses of 60 cycle voltage of any of the sequences described in connection with FIGS. 2–5. Such a sequence arriving over the conductor 2 causes delivery by the transmitter to the power line 202, 203 of a corresponding sequence of pulses of a first carrier frequency $f1$ while the same sequence arriving over conductor 4 causes delivery to conductors 202 and 203 of the same sequence of pulses, but in a carrier frequency $f2$, and so on. The number of output lines 2, 4, 6 and 8 from the apparatus of the invention is of course a matter of choice, from one to any desired larger number.

The transmitter 1 contains an audio oscillator, a power amplifier, and switching circuits to select the various frequencies in the audio oscillator. Since these are conventional elements, it is not believed that their construction, or that of the transmitter 1, need be illustrated or described in further detail.

Figures 1A, 1M:
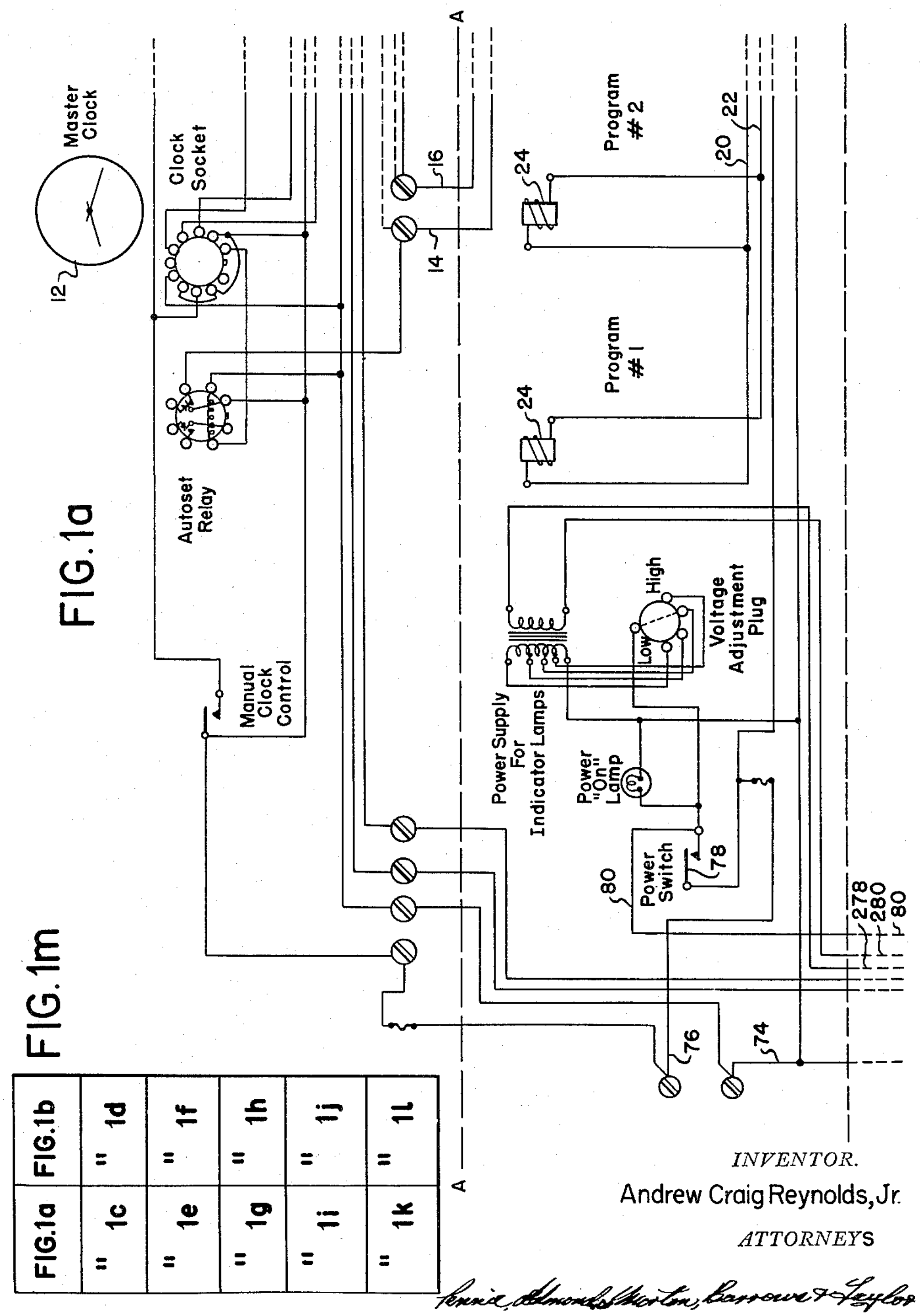

For development of the pulse sequences to be delivered to conductors 2, 4, 6 and 8 at selected minute time intervals, the apparatus of FIG. 1 begins with a master clock 12 shown in FIG. 1*a*. This master clock, together with the other components illustrated in FIG. 1*a* and 1*b* above the dashed line A—A in both of those figures, applies D.C. current impulses at one minute intervals between conductors 14 and 16 for delivery, via the polarity relay assembly generally indicated at 18, to conductors 20 and 22 for energization of the driving solenoids 24 of three "program instruments" one of which is shown in the perspective view of FIG. 6. The elements of structure of these instruments essential for an understanding of the circuit of FIG. 1 are shown in that figure, whereas FIG. 6 illustrates the actual construction of the program instrument.

Figure 1B:
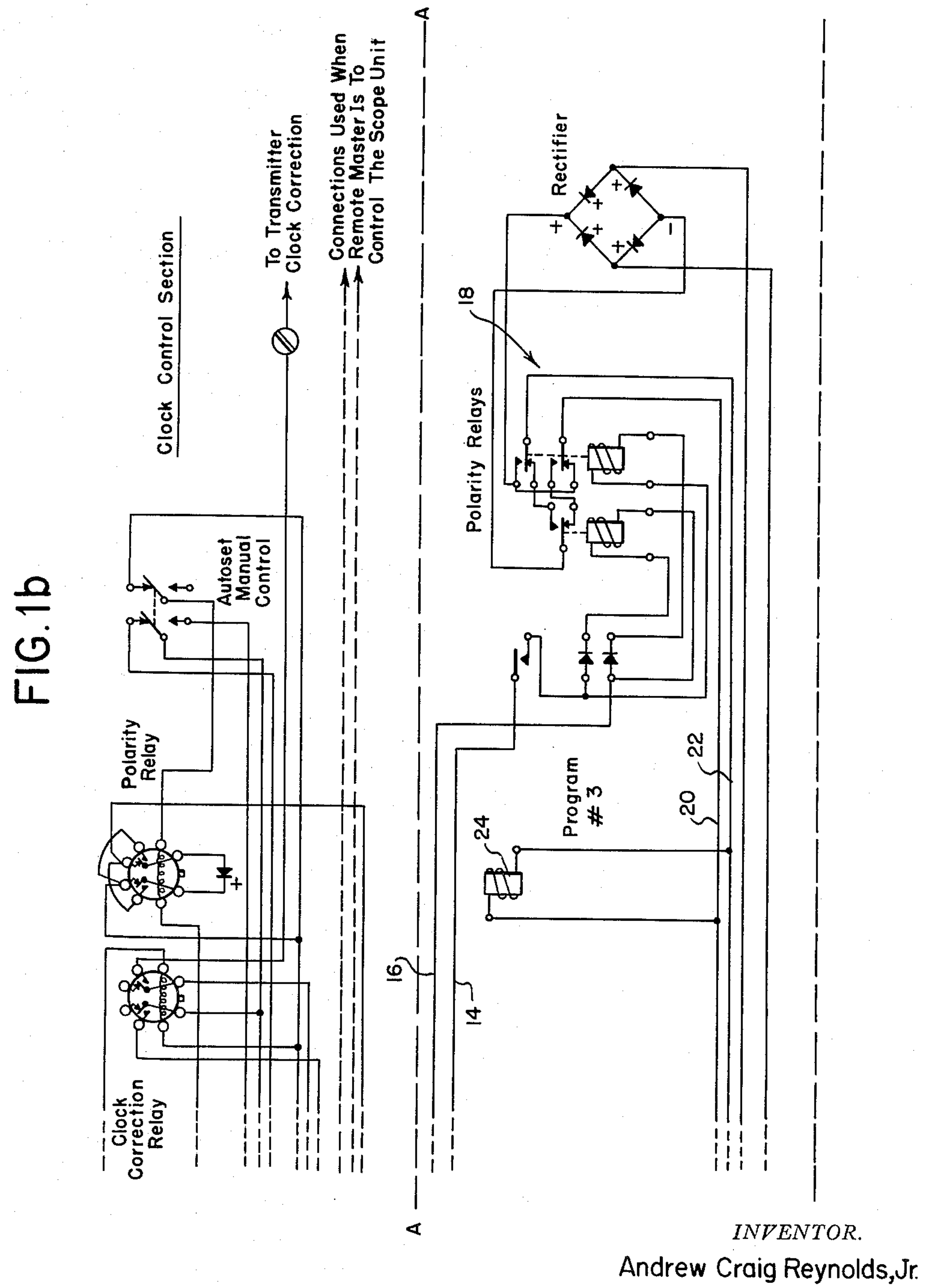
Figure 6:
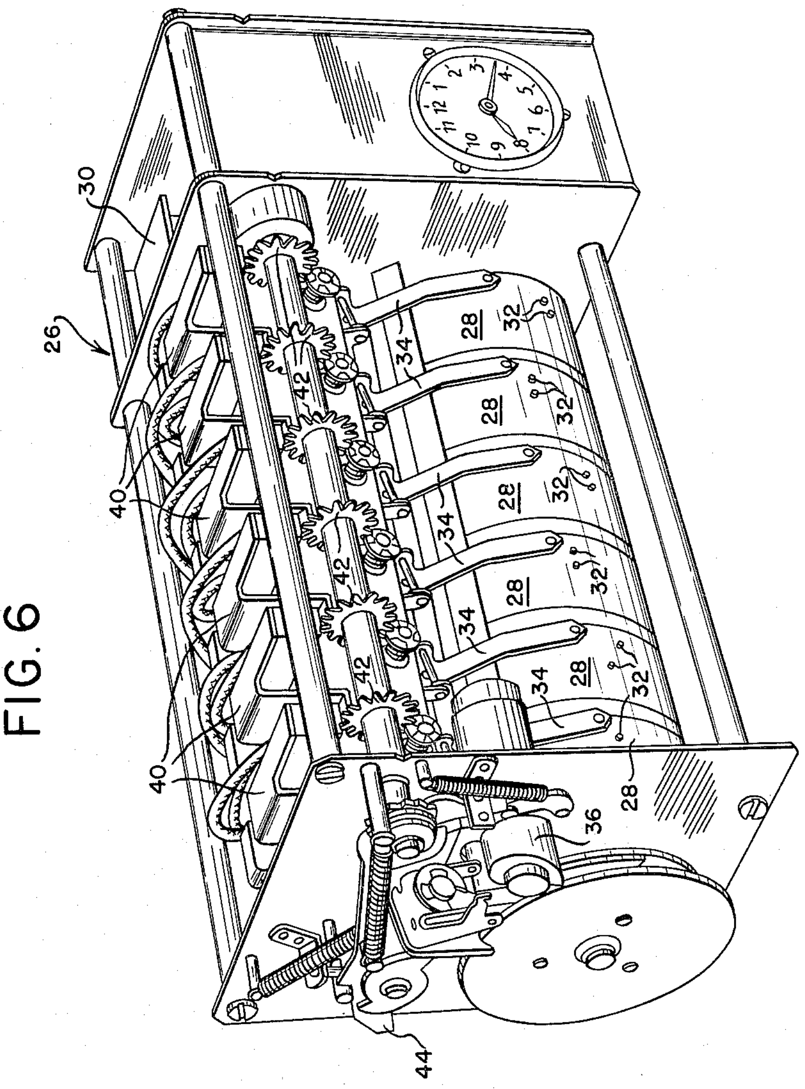
FIG. 6 is a perspective view of a program instrument suitable for use in the apparatus of FIG. 1.

The program instrument of FIG. 6, generally indicated at reference character 26, is a device known per se. It includes a plurality of schedule drums 28 driven together step by step at one minute intervals by a timing armature 30, in response to timing pulses supplied by a master clock to a solenoid 24 as shown in FIGS. 1*a* and 1*b*. The drums make one revolution in 120 steps, traversed in a time of two hours. Each drum has twelve side-by-side peripheral rows of equally spaced holes into which scheduling pins 32 may be inserted, to bring them successively under sensing fingers 34, of which one is provided for each drum. The sensing fingers are mounted together on a carriage, not visible in FIG. 6, for axial movement with respect to the drums under control of a two-hour helix 36 which serves to shift the fingers from one row of pins or pin holes to the next at the completion of each revolution by the drums. A switch 38 (FIGS. 1*e* and 1*f*), not visible in FIG. 6, is provided for each drum, arranged to be closed by the sensing finger of that drum when a scheduling pin passes under the sensing finger.

By virtue of the twelve rows of scheduling pin holes with 120 holes in each, each drum provides 1440 consecutive pin holes, one for every minute in a twenty-four hour interval. Each drum can therefore develop a signal at any one or more minutes of a day's time interval.

For optional connection in series with the switch 38 of each drum the program instrument of FIG. 6 includes a second switch 40. These switches are spring loaded to open position, like the switches 38, and each is closed for twelve hour periods by means of a calendar cam 42. These cams, one for each of the drums of the program instrument, are provided with 14 teeth, and advance by one tooth interval at the beginning of every twelve hour period by operation of a calendar pawl 44. The teeth can be bent out of the way to leave the associated switches 40 open during the twelve hour periods alloted to such teeth, thus rendering ineffective, if the switch 40 of the appurtenant drums are in circuit, the scheduling pins in the corresponding twelve hour portion or portions of the drum cycle.

Figure 1C:
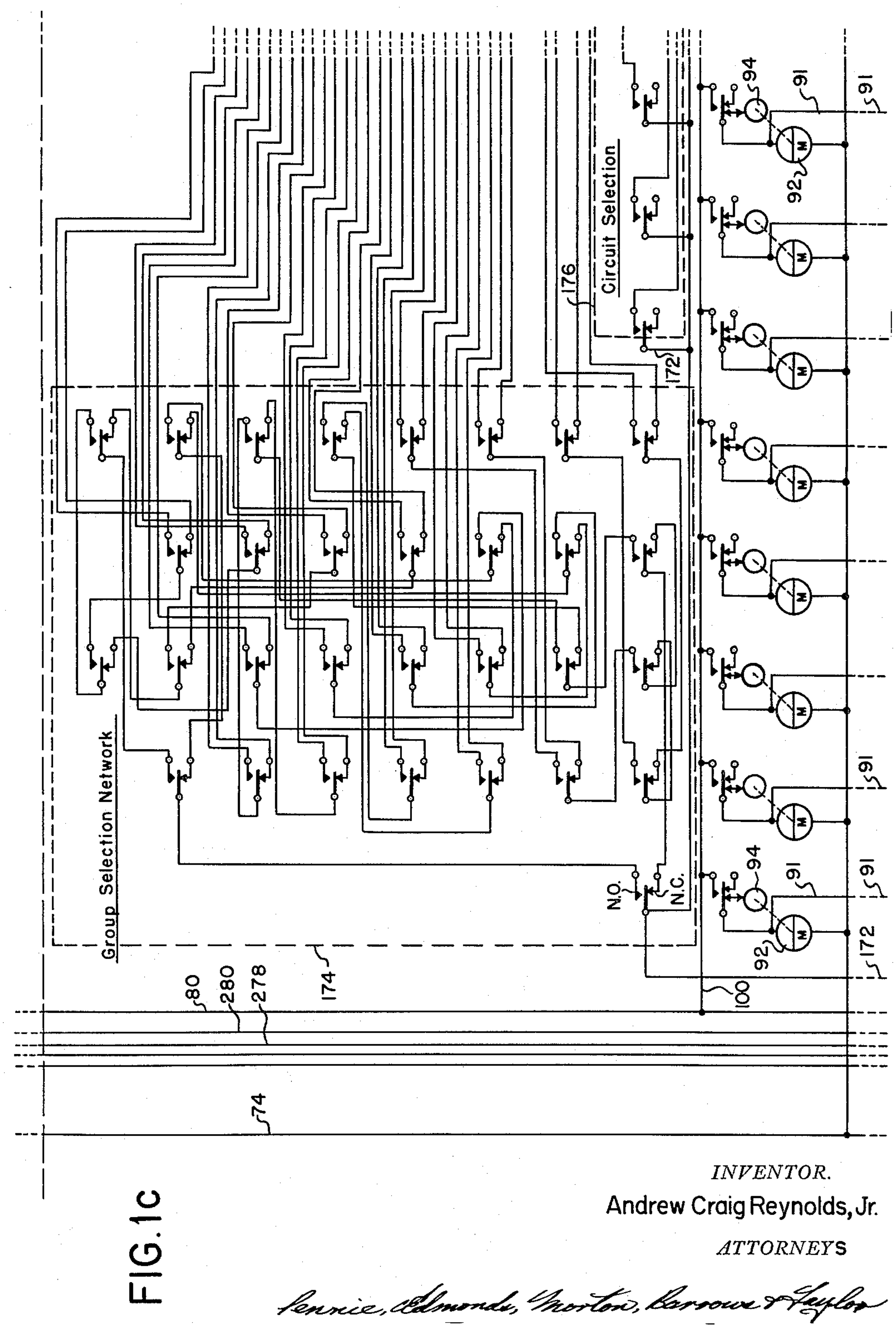
Figure 1D:
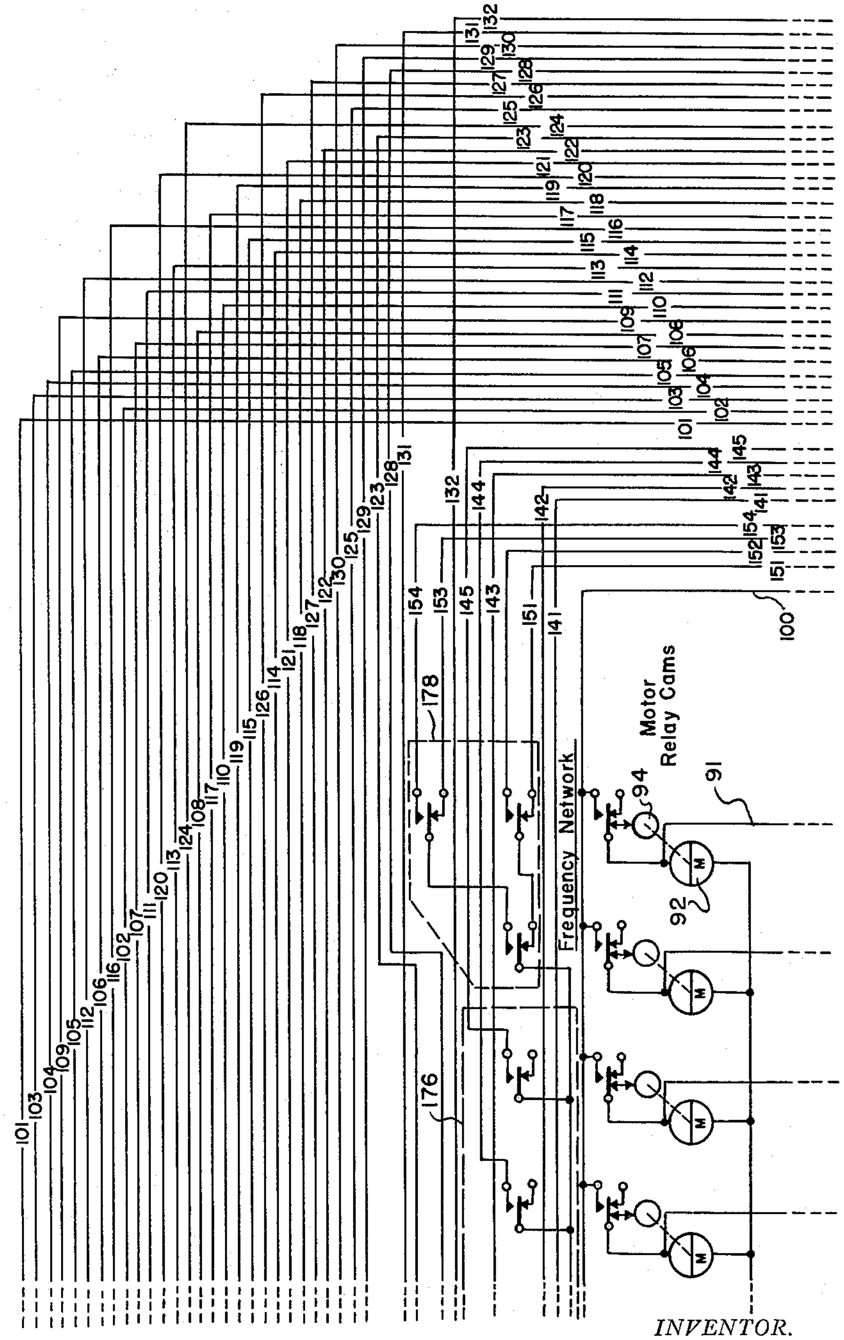
Figure 1E:
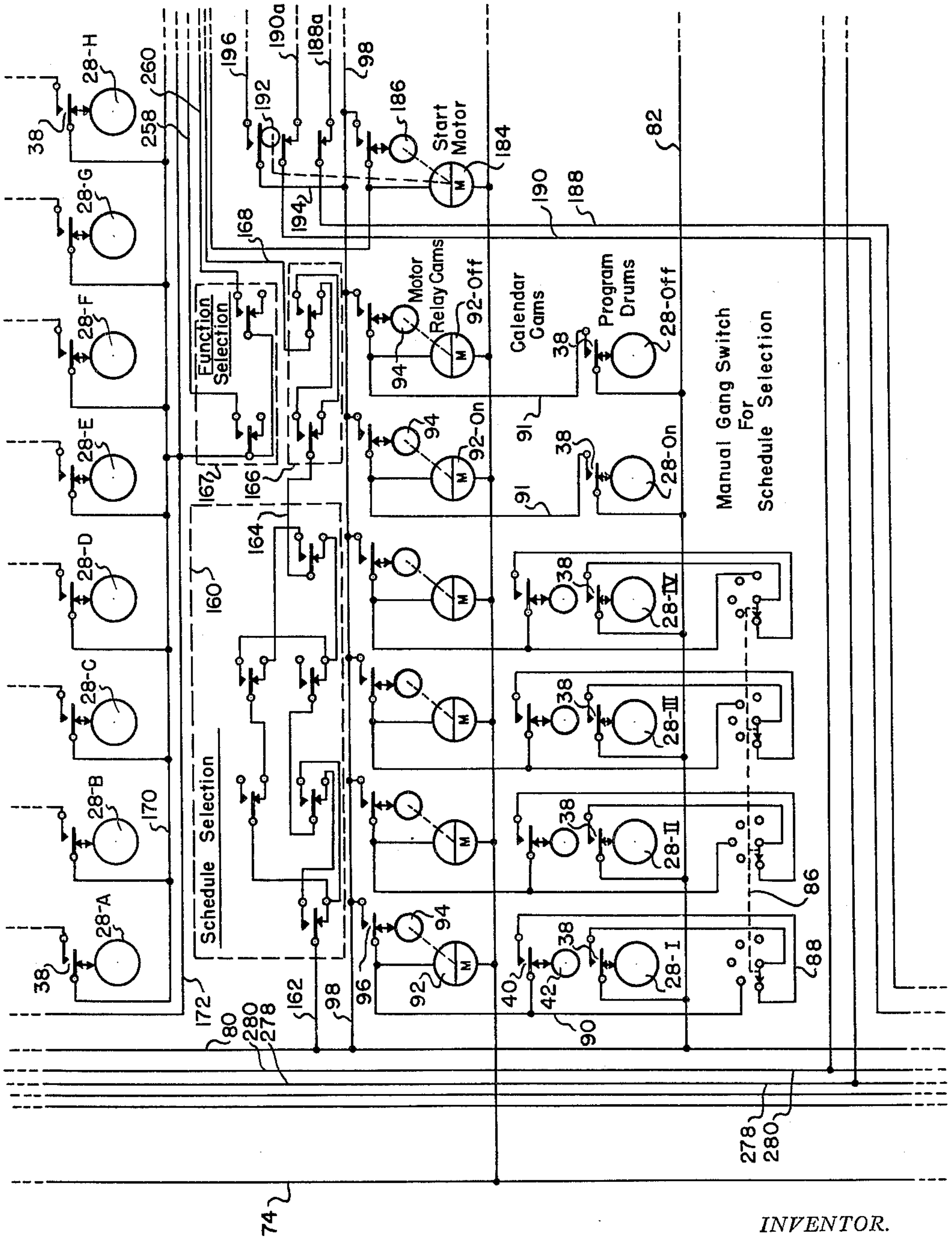
Figure 1F:
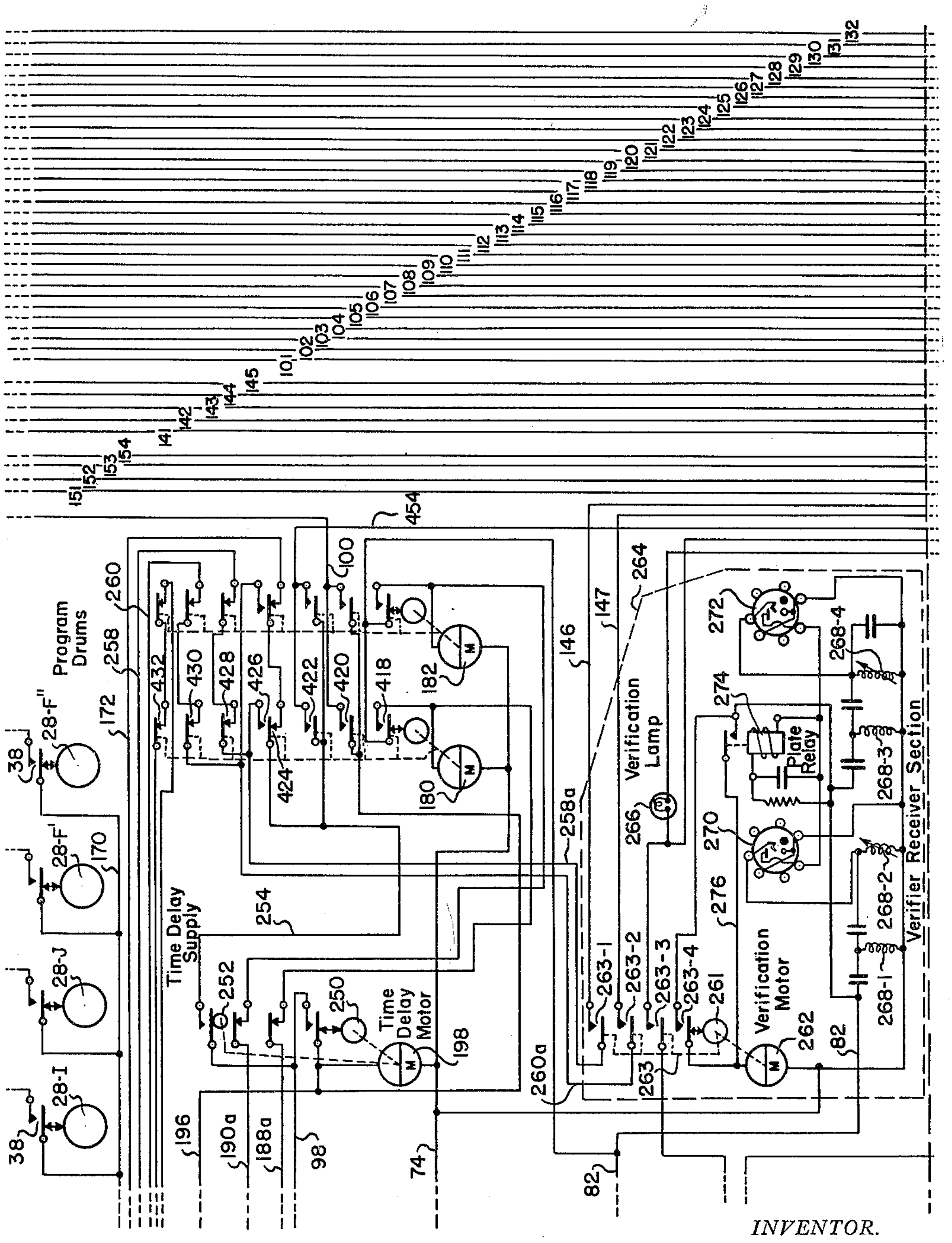

Referring now to FIGS. 1*e* and 1*f*, the signal generator of FIG. 1 includes three six-drum program instruments of the type illustrated in FIG. 6. In these figures, only the drums, switches and calendar cams are shown. Six drums 28–A to 28–F of one instrument are allocated one to each of the pulses or pulse times A to F of FIG. 2. On a second instrument four drums 28–G to 28–J are similarly allocated to the pulse times G to J respectively, and two drums 28–F′ and 28–F″ are allocated to the selection of one of the four frequencies $f1$ to $f4$ in which the coded pulse signals are ultimately to be generated by the transmitter 1.

On these two program instruments the switches 40 of the calendaring function are not used, the drums thereof being employed, together with the drums 28–On and 28–Off of the third program instrument, to set up a pattern of signals of the type illustrated in FIG. 2 available to cover a twenty-four hour interval.

In the third program instrument four drums I to IV are employed with their calendar switches and cams 40 and 42 to permit selection, during twelve hour periods of the week, of any one of four schedules, i.e. sequences of the signals set up on drums 28–A to 28–J, 28–F′ and 28–F″ including different sub-combinations of those signals.

The last two drums 28–On and 28–Off of the third program instrument are employed, without calendar cams and switches, to schedule the On or Off nature of the signals scheduled on drums 28–A to 28–J, 28–F′ and 28–F″, i.e. the absence or presence, respectively of the Off pulse of FIG. 2 in the signals so scheduled.

Figure 1G:
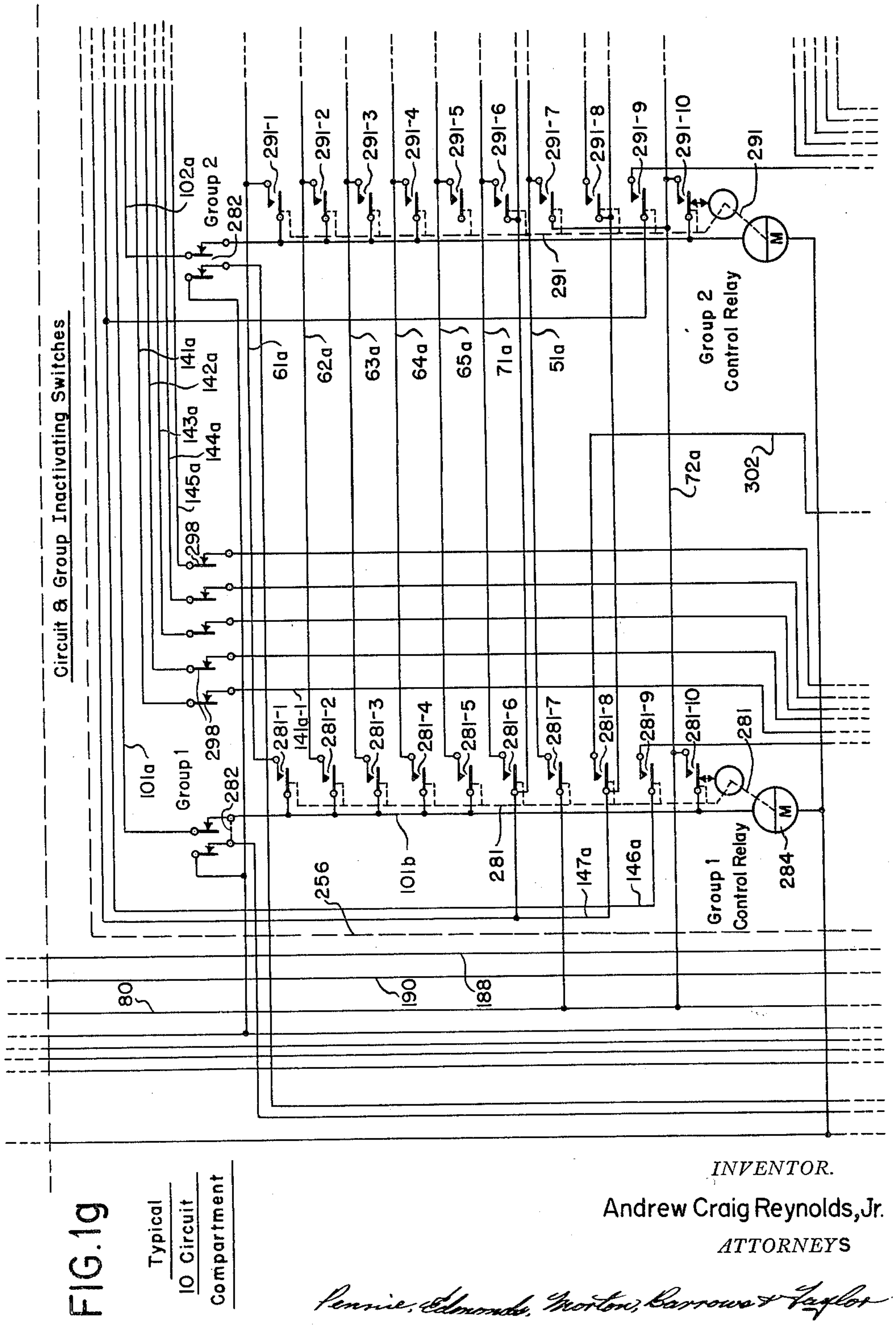
Figure 1H:
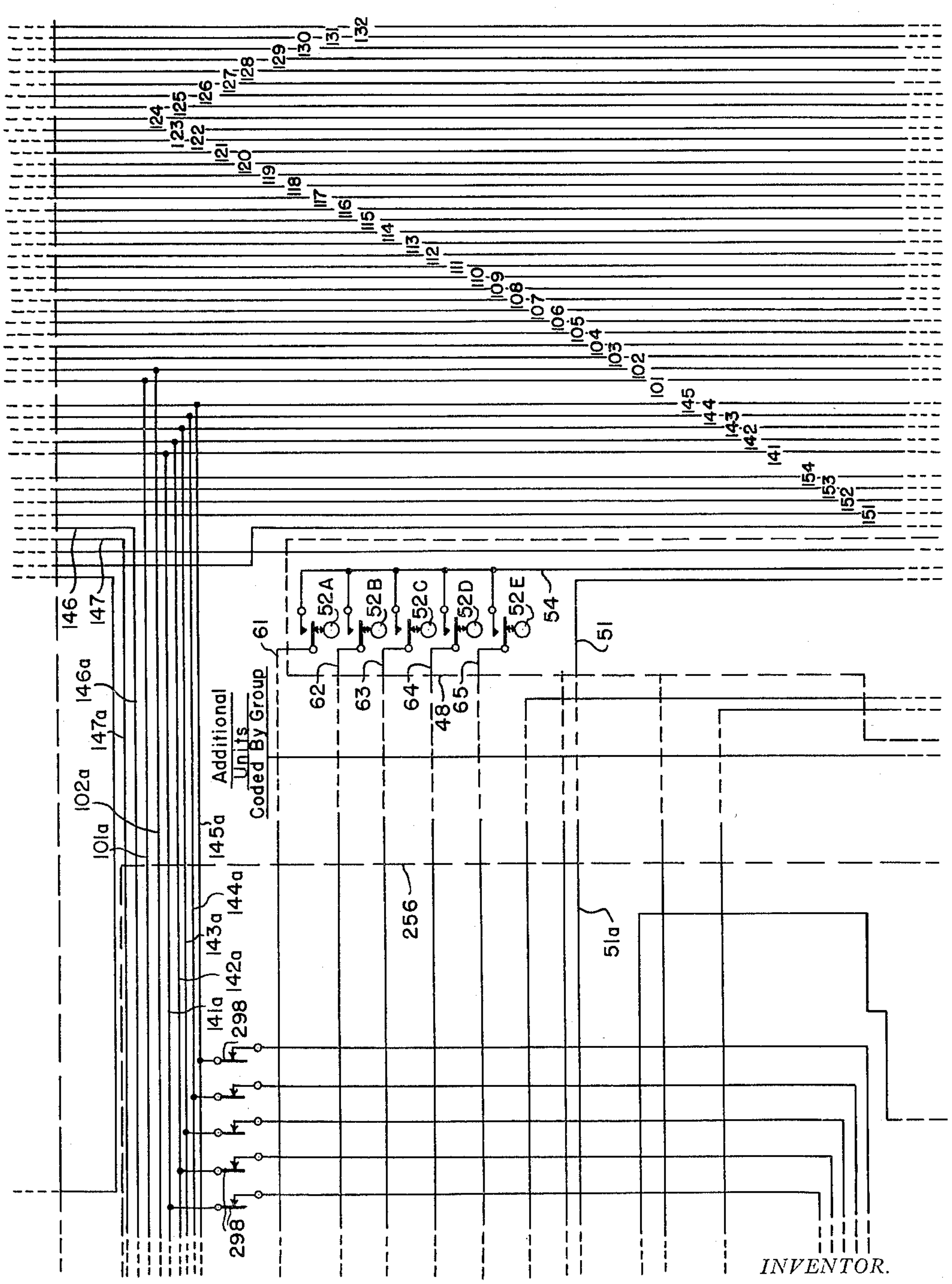
Figure 1I:
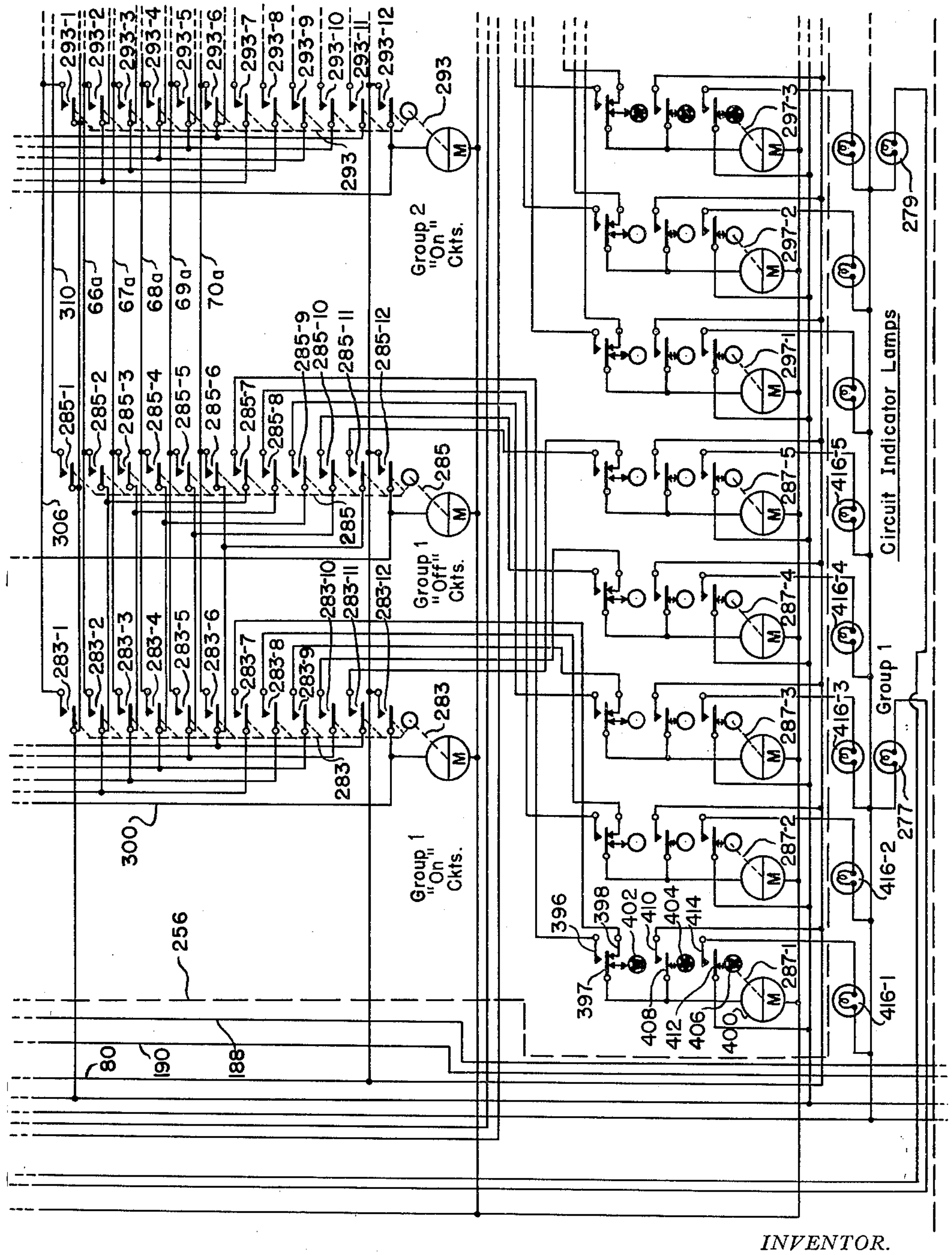
Figure 1J:
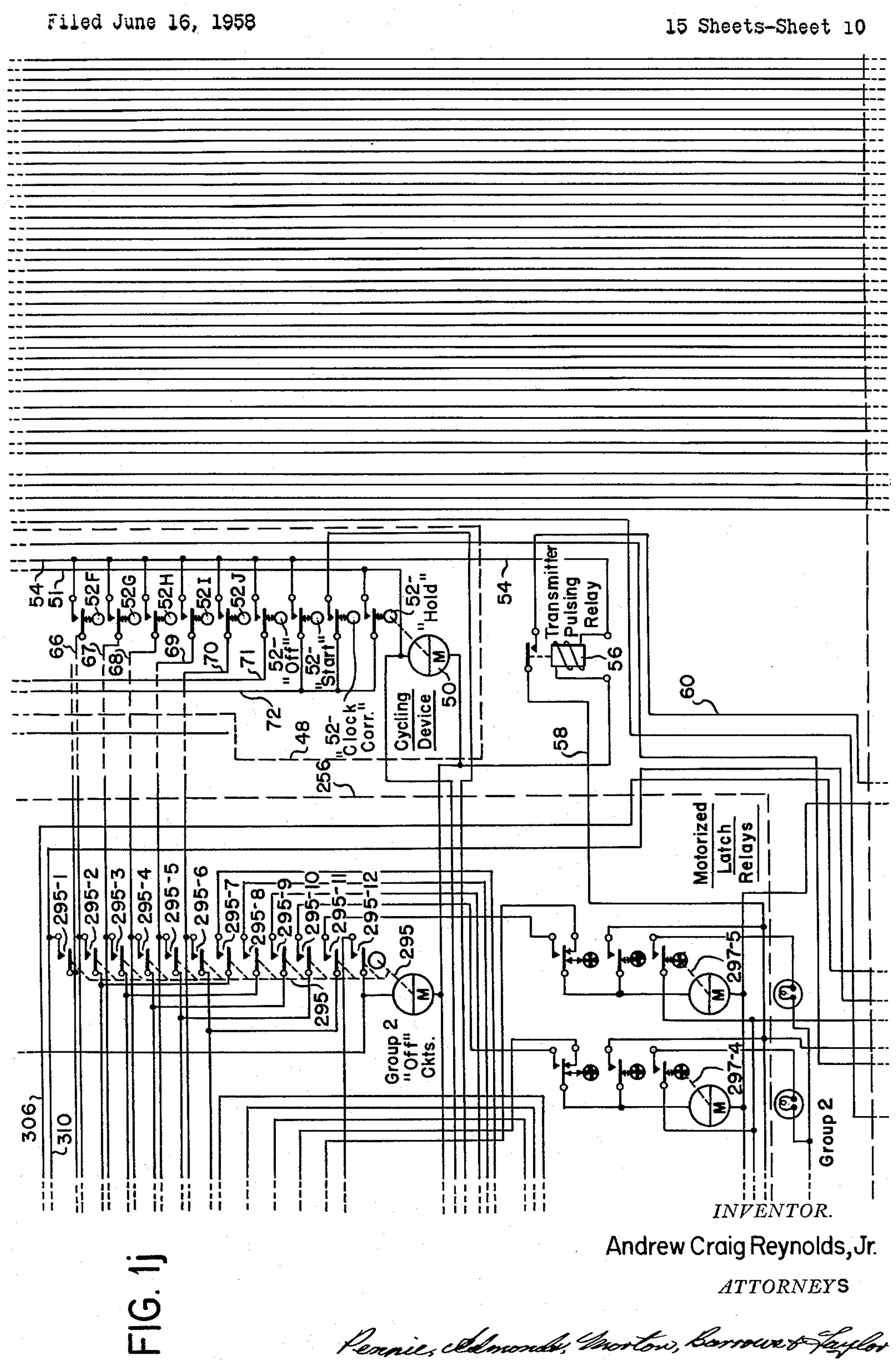
Figure 1K:
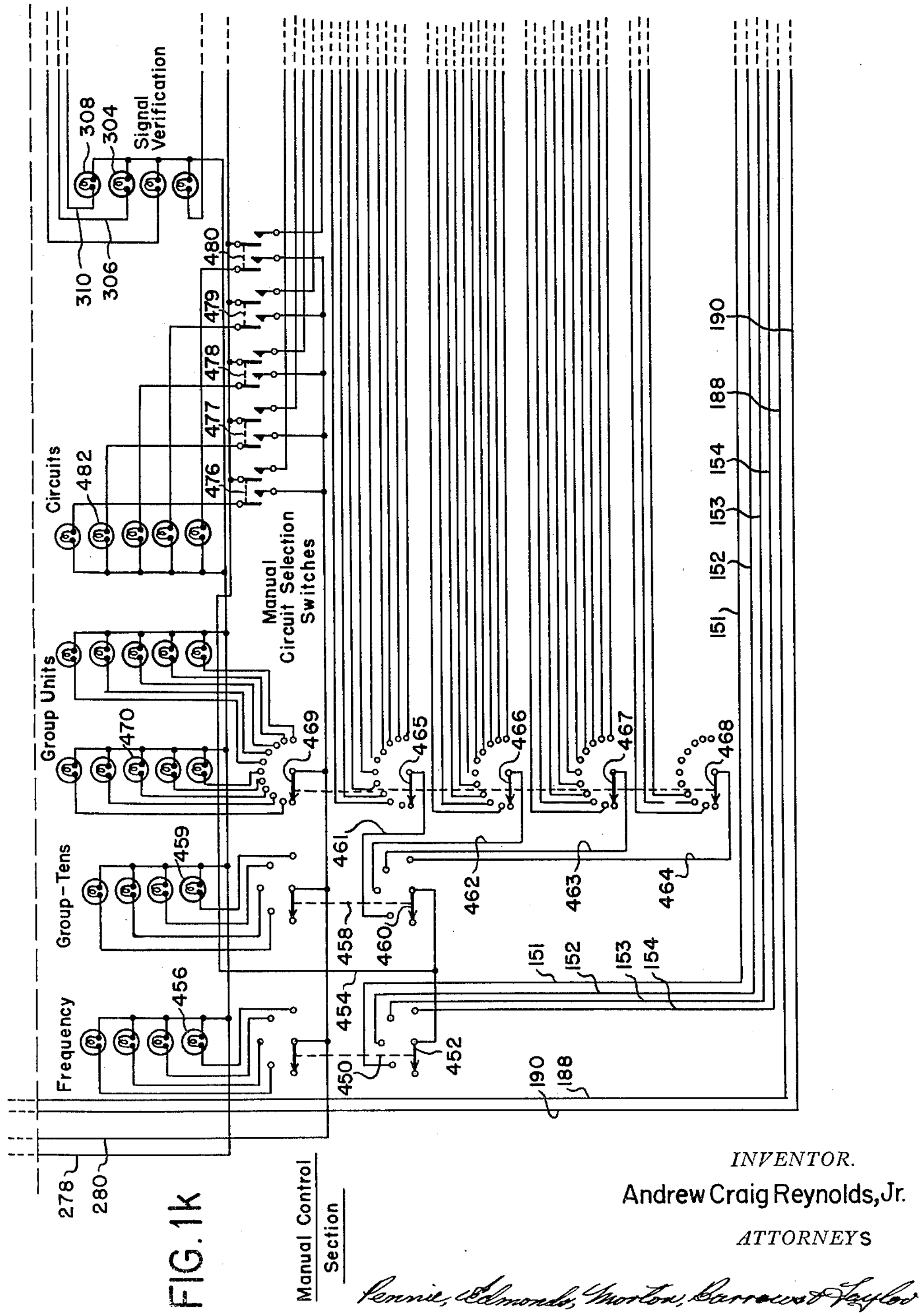
Figure 1L:
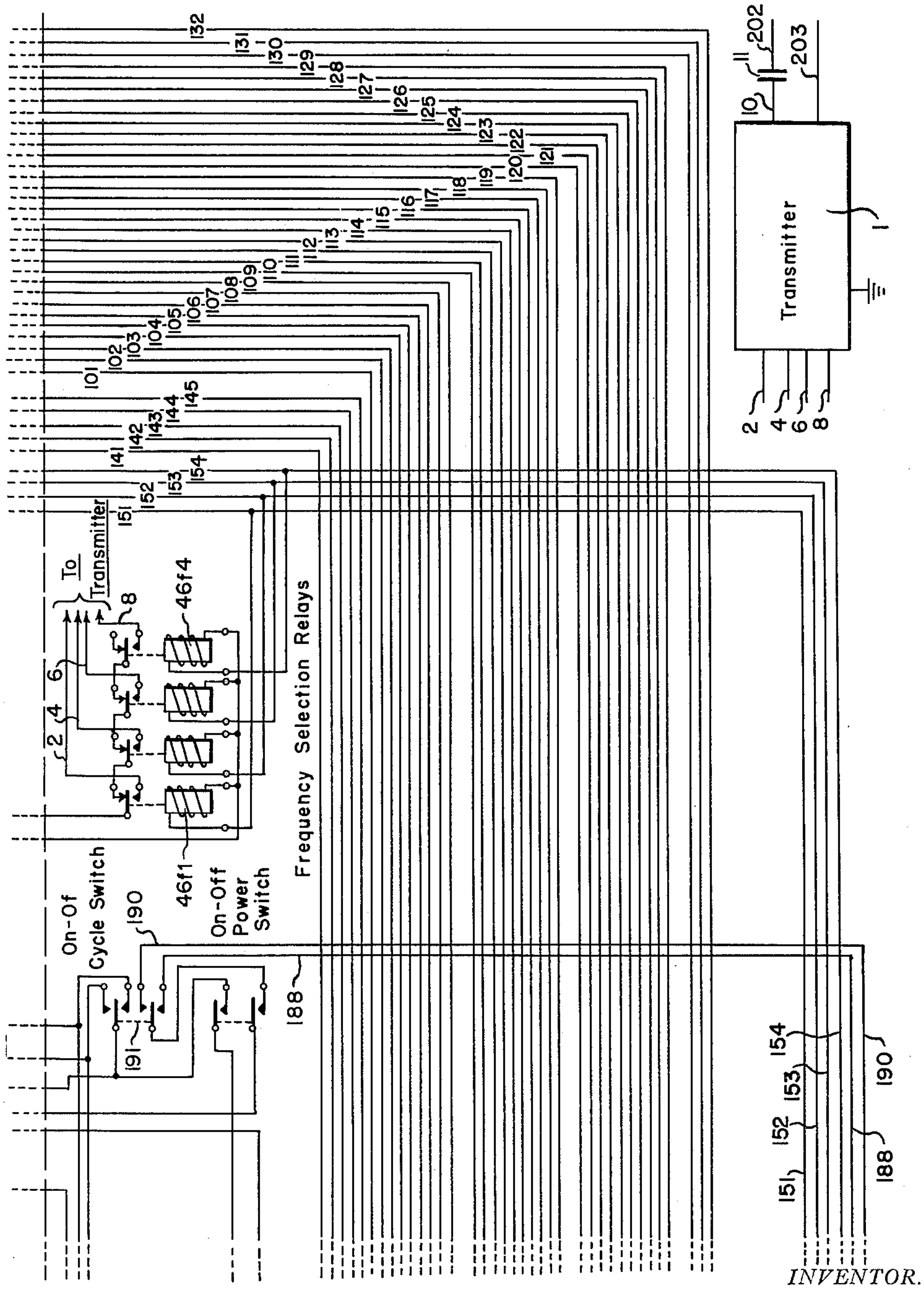

The 60 cycle current pulses, at the times of the start, A–J and Off pulses of FIG. 2, which are sent, via one of the frequency selecting relays 46–$f1$ to 46–$f4$ of FIG. 1L to conductors 2, 4, 6 or 8 and thence into transmitter 1, are ultimately generated in a cycling device generally indicated at the dash line box 48 in FIGS. 1*h* and 1*j*. This device includes a shift motor 50, which may be similar to the motor 215 of FIG. 3, making a complete revolution in one minute when once energized. Coupled to the motor are fourteen cams 52A to J, Off, "start," "clock correction," and "hold" which close their associated switches for corresponding fractions of the minute cycle. For the A to J, start and Off cams, these times are indicated in FIG. 2. The "hold" cam closes its switch through all but a fraction of the first second of the cycle, the "clock correction" cam closes its switch for a selected short portion of the cycle for energization of the clock correction relay in FIG. 1*b*, so that correction impulses of opposite polarity may be sent to the program instruments through the polarity relay assembly 18, in accordance with details of the construction of the program instruments not material to an understanding of the present invention. Closure of the cycling device cam switches A to J, start and Off, serves to extend, to a conductor 54 at corresponding phases of the cycle, power from those of the twelve input conductors 61 to 72 to those switches which are in any minute cycle energized, in accordance with the make up of the signal to be developed. Energization of this conductor 54 completes the energizing circuit for the actuating coil of a transmitter pulsing relay 56. Closure of the single normally open contact on this relay completes a circuit from an energized conductor 58 through a conductor 60 and the contacts of the frequency selection relays 46, whose operation will be explained presently, to one of the transmitter input conductors 2, 4, 6 and 8.

Activation of appropriate ones of the input conductors 61 to 72 to the cam operated switches of the cycling device 48, and of a selected one of the frequency selection relays, is the consequence of energization, by means of the program instruments already described and of certain auxiliary components, of one of thirty-two "group" conductors 101 to 132, of one of five "circuit" conductors 141 to 145, of either an "on" conductor 146 or of an "off" conductor 147, and of one of four frequency selecting conductors 151 to 154.

The frequency selecting conductors lead directly from the frequency selecting network of FIG. 1*d*, comprising motor driven contacts associated with drums 28–F′ and 28–F″, to the actuating coils of the relays 46–$f1$ to 46–$f4$.

The group, circuit, and On and Off conductors 101 to 132, 141 to 145 and 146 and 147 on the other hand lead to a plurality of cycling device input line selecting units, one of which comprises the whole of FIGS. 1*g*, 1*h*, 1*i*, and 1*j* with the exception of the cycling device and transmitter pulsing relay already mentioned. The On, Off, and circuit conductors 146, 147 and 141 to 145 lead into each one of these input line selecting units. In the embodiment illustrated each unit is equipped to prepare signals of only two different combinations of the group selection pulses A to E. Each unit therefore receives as input only two of the group conductors 101 to 132.

Power for the complete apparatus of FIG. 1, for example at 115 volts, 60 cycles, single phase, is supplied to two input conductors 74 and 76 (FIG. 1*a*). Conductor 74 may conveniently be assumed to be grounded. The main on off power switch is shown at 78. When closed, it energizes a conductor 80, one of whose extensions 82 applies power to one of the contacts of switches 38 on the scheduling drums, 28–I to 28–IV, and on the On and Off drums 28–On and 28–Off of the third program instrument.

Let it be assumed that a signal Start A B C D E F is to be generated on $f1$ carrier frequency at 14:52 hours on Tuesday. This means that each of the drums 28–A to 28–F in FIG. 1*c* will have a schedule pin the 892nd pin hole thereof, that the On drum of FIG. 1*e* will have a pin in that hole likewise, that the Off drum will not, and that of the one or more schedule drums I to IV of FIG. 1*e* which may have a pin in that hole one and only one, drum I, say, will be effectively in circuit by the presence in operative position of a tooth on its calendar cam 42 for the fourth twelve hour period of the week, assumed to begin at Sunday midnight. It also means, in view of the make-up of the network 178 of frequency conductor selecting contacts operated by drums 28–F′ and 28–F″, that neither of those drums will have a schedule pin in the 892nd hole thereof.

Closure of the switch 38 on drum I at 14:52 hours on Tuesday will extend power from conductor 82 to a conductor 84, through the left-most deck of a ganged manual schedule selection switch 86 to a conductor 88 and thence, through the closed calendar switch 40 to a conductor 90.

Associated with each of the program instrument drums, except the On and Off drums 28–On and 28–Off, is a shift motor 92 of 1 r.p.m. output shaft speed, like the motor 215 of FIG. 3. Each of these motors is coupled at unity speed ratio to a cam 94 operating one or more switches shown in the figures aligned in a vertical row directly above such cam. A first normally open switch contact 96 on each of the cams 94 operates as a holding contact, serving when closed to hold its motor, once energized, for a complete minute cycle by connecting it to one of the extensions 98 and 100 of conductor 80 (FIGS. 1*c* and 1*e*).

For each of the scheduling drums 28–I to 28–IV a conductor 90 leads from calendar switch 40 to the ungrounded terminal of the associated motor 92. On each of the 28–On and 28–Off drums a conductor 91 leads from the side of switch 38 opposite the energized conductor 82 directly to the ungrounded terminal of the associated shift motor 92. Similarly on each of drums 28–A to 28–J, 28–F′ and 28–F″, a conductor 91 leads from the contact of the switch 38 of that drum opposite a conductor 170, to be mentioned presently, to the ungrounded terminal of the associated shift motor 92.

The other switch contacts operated by the cams 94 of scheduling drums 28–I to 28–IV, shown within a dash line box 160 are arranged and interconnected to insure that power is extended from an extension 162 of conductor 80 to a conductor 164 if and only if one and only one of the drums 28–I to 28–IV having a schedule pin for the instantaneous minute interval is "calendared in," i.e. rendered operative during the instantaneous twelve hour period by its cam 42. This prevents the generation of signals from conflicting schedules but requires that one be calendared in and have a schedule pin for the minute in question.

A set of switch contacts shown at the dash line box 166 which are operated by the cams 94 of the motors 92–On and 92–Off are likewise arranged and interconnected to insure completion of a circuit from conductor 164 to a conductor 168 if and only if one and only one of those motors is energized, i.e. if and only if one and only one of drums 28–On and 28–Off has closed its switch 38.

Since the actual response of the load devices such as lamp 224 in FIG. 4 occurs at or about the starting time of the Off pulse of FIG. 2, somewhat in advance of the end of the minute interval shown in that figure, and since it is desired to make possible such response at the beginning of each minute interval of true time, the program instruments are operated a few seconds in advance of true time and the selection, i.e. energization, of a combination of group, circuit and frequency conductors for activation of a cycling device input line selecting unit is arranged to occur with a delay suitable to cause the start pulse in each transmitted signal to begin a little later than zero seconds of unit intervals of true time. In this way the time of the "Off" pulse may be made to coincide with the beginning of each minute of true time.

This is accomplished by the interposition of a time delay between the energization of conductor 168, representative of a correct scheduling at drums 28–I to 28–IV and of correct arrangement of the drums 28–On and 28–Off, and the energization of conductors 170 and 172. Conductor 170 feeds the input contacts of switches 38 on drums 28–A to 28–J, 28–F′ and 28–F″. Conductor 172 feeds the group selection network 174 of cam operated switches associated with drums 28–A to 28–F, the circuit selection network 176 of cam operated switches associated with drums 28–F to 28–J, and the frequency selection network 178 of cam operated switches associated with drums 28–F′ and 28–F″.

To this end conductor 168, after passing through a normally closed cam operated switch on each of the "manual on" and "manual off" 1 r.p.m. shift motors 180 and 182 presently to be described, connects with the ungrounded terminal of a "start" 1 r.p.m. shift motor 184. This motor drives a cam 186 which for substantially one minute closes a hold contact for motor 184 to conductor 98 and which opens contacts in series with conductors 188 and 190 provided for energization of motors 180 and 182 by operation in one or the other direction of a manual switch 191 (Fig. 1L) when manual control of the cycling device is undertaken. Coupled to motor 184 is a second cam 192 which effects, with a ten second delay, for example, a short closing (e.g. five seconds) of a further contact between an extension 194 of energized conductor 80 and a further conductor 196.

With ten second delay therefore, after the beginning of the minute cycle of the program instruments, power is applied to a "time delay" 1 r.p.m. shift motor 198 whose first cam 250 establishes a one minute holding circuit therefor to conductor 98 and opens for one minute contacts in series with the continuations **188*a* and 190*a* of conductors 188 and 190 through the switch contacts of motor 184**.

A second cam 252 on motor 198 closes, without delay but for an interval of a few seconds only, a contact between energized conductor 98 and a conductor 254 which leads, through a normally closed cam operated switch contact on each of motors 180 and 182, to conductors 170 and 172.

With ten second delay therefore over the start of the minute cycle of the program instruments, power is made available at the switches 38 of the pulse and frequency selection program drums 28–A to 28–J, 28–F′ and 28–F″. Those of these drums having scheduling pins under their sensing fingers accordingly have their switches 38 closed, and the 1 r.p.m. shift motors 92 associated with those drums are accordingly energized. One minute holding circuits therefor are at once established to conductor 100 at the normally open cam-operated switch contacts immediately above the cams 94 of those motors while the other cam-operated switch contacts, for all of the drums 28–A to 28–J, 28–F′ and 28–F″, in the networks 174, 176 and 178 effect energization of a selected one of the group conductors 101 to 132, a selected one of the circuit conductors 141 to 145, and a selected one of the frequency selecting conductors 151 to 154.

In the example which has been assumed, of a signal A B C D E F on *f*1 frequency at 14:52 hours on Tuesday, it may be seen from FIGS. 1*c* and 1*d* that it will be conductors 101, 141 and 151 which will be energized. The convention for normally open and normally closed relay contacts (whether cam or solenoid driven) followed throughout the drawings is indicated by the legends "n.o." for normally open and "n.c." for normally closed applied to the uppermost contacts on cam 94 of the shift motor 92 associated with drum 28–A in FIG. 1*c*. With this observation, a detailed description of the conductors and contacts in the networks such as 160, 174, 176, 178 and the like is believed to be unnecessary. "Normally open" of course means open for the de-energized state of the shift motor to whose cam or cams the contact in quetion belongs, if the contact is cam operated, and, in solenoid operated relays, "normally open" of course means open for the de-energized state of the actuating coil of such relay.

With conductor 101 energized the appropriate one of the cycling device input line activating units has been selected, namely that which is shown in FIGS. 1*g*, 1*h*, 1*i* and 1*j* within dash line box 256 since conductor 101, of the pulse group A B C D E, leads at an extension **101*a*** thereof into that box.

With conductor 141 energized, the extension **141*a* thereof which leads into box 256 is also energized, and with conductor 151 energized, the actuating coil of the frequency selecting relay 46*f*1 is energized also. In view of the coded make-up of the unit 256, presently to be described, energization of its input conductor 101*a* will produce generation in the transmitter 1 of the corresponding ocmbination A B C D E of group selection pulses. With conductor 141*a* energized, unit 256** will in addition cause the transmitter, if it is functioning properly, to transmit the circuit identification pulse F.

The "on" as distinguished from "off" nature of the signal to be developed (i.e. the absence or presence of an Off pulse therein) was determined by the presence of a scheduling pin in the 892nd hole of drum 28–On and the absence of such a pin in drum 28–Off. Additional contacts on the cams 94 associated with the motors 92 controlled by those drums, shown within a dash line box 167 (FIG. 1*e*), insure that the time delayed energization of conductors 170 and 172 is extended, via a conductor 171 and the contacts in dash line box 167, to one and only one of two conductors 258 and 260. These conductors are extended, as conductors 268*a* and 260*a* after passage through normally closed cam-operated contacts on the now de-energized "manual on" and "manual off" motors 180 and 182, to the input to two normally open cam-operated contacts 263–1 and 263–2 of a "verification" relay 263 driven by a 1 r.p.m. shift motor 262. Reference character 263 is applied to a dashed line shown coupling together the shift motor, its cam 261, and the movable elements of the four sets of relay contacts. This relay is part of a vertifier receiver indicated in FIG. 1*f* at a dash line box 264, the function of which is to test for amplitude and duration the "start" pulse as actually generated by transmitter 1 on the selected one of the carrier frequencies *f*1 to *f*4. If the start pulse so tested is insufficient in either respect, the scheduled combination of the group recognition pulses A to E will be transmitted but the scheduled combination of the circuit selection pulses F to J will not be, so that no load device will be affected. Such signal failure is signalized by failure of the verification lamp 266 to light.

The verification receiver includes four tuned input circuits identified at the windings 268–1 to 268–4. These circuits are tuned respectively to the carrier frequencies *f*1 to *f*4 of transmitter 1, and have the transmitter output applied thereto by means not shown, which may take the form of a winding to which the transmitter output signal is applied, this winding being coupled to each of windings 268–1 to 268–4.

The start pulse, which as will presently be explained is developed by the unit 256, the cycling device 48 and the transmitter 1 automatically upon energization of the group identifying conductor 101, is tested in circuit 264 by two grid controlled gas discharge tubes 270 and 272. These control the application of power to the actuating coil of a relay 274 in their plate circuit. If the start pulse is of sufficient amplitude and duration relay 274 will close its single normally open contact, briefly extending power from the energized conductor or bus 82 to a conductor 276 leading to the ungrounded terminal of motor 262. Energization of motor 262 closes, on contact 263–4, a holding circuit to conductor 82. Closing of contact 263–3 completes the circuit for lamp 266 between two low voltage lamp circuit conductors 278 and 280 (FIG. 1*e*). Closing of the contacts 263–1 and 263–2 extends the "On" and "Off" conductors 258*a* and 260*a* respectively to conductors 146 and 147 previously mentioned, which connect into each of the sixteen units 256, the extensions in the case of the unit shown being identified at reference characters 146*a* and 147*a*. There are, in the embodiment illustrated, sixteen units 256 because that embodiment provides thirty-two different coded groups of group recognition pulses and because each of the units 256 contains the components necessary to cause the cycling device 48 to develop either of those two coded groups of pulses.

Unit 256 receives signal inputs on extensions 101*a* and 102*a* of the group one and group two group selection conductors 101 and 102, on extensions 141*a* to 145*a* of the five circuit selection conductors 141 to 145, and on extensions 146*a* and 147*a* of the "on" and "off" conductors 146 and 147. Within the unit the group selection conductors 101*a* and 102*a* are passed through switches 282 for manual disablement of the system with respect to the load devices which are responsive to signals including the groups of the code pulses A to E whose scheduling in the program instruments produces energization of those group selection conductors. Each switch 282 includes a second pair of contacts, as shown, for control of a signal lamp, shown at 277 for the switch 282 in line 101*a* of group one (group code A B C D E), and shown at 279 for the switch 282 in line 102*a* of group two (group code A B C D $\overline{\text{E}}$). The lamps are illuminated at all times except when their respective switches 282 are open. Opening of a switch 282 prevents generation of signals including the group code in whose group selection conductor such switch appears.

Each cycling unit input line activating device such as unit 256 illustrated includes, for each of the two combinations of group selection pulses A to E allotted thereto a "group control" relay, an "on" circuits relay, an "off" circuits relay, and a set of latch relays for control of indicator lamps. All of these are motor driven, cam-operated relays. For the group one combination of all of pulses A to E included in the signal A B C D E F under discussion, these relays are indicated at reference characters 281, 283 and 285 for the group control relay, on circuits relay and off circuits relay, and at 287–1 to 287–5 for the latch relays. The corresponding relays for the group two combination A B C D $\overline{\text{E}}$ are indicated at reference characters 291, 293, 295 and 297–1 to 297–5.

Each of the relays 281, 283, 285, 291, 293, 295 comprises a 1 r.p.m. shift motor having coupled thereto a cam driving a plurality of contacts, all normally open, which are closed when the motor is energized and remain closed for substantially the whole of the minute cycle. The reference character is applied on the drawing to a dashed line which represents the coupling between the cam and its contacts, shown disposed vertically above the cam.

The group control relay energized by the energized one of conductors 101 to 132 effects, when energized, energization of the cycling device drive motor 50, and of appropriate ones of the cycling device input conductors 61 to 65 for development of those of the A to E pulses which are present in the signal being developed. The group control relay also completes the circuit to the cycling device input conductor 71 for development of an Off pulse, such pulse being then developed or not according as this circuit does or does not become energized.

It is also via contacts of the group control relay that the associated on circuits relay or off circuits relay is energized, according as the signal to be generated is an "on" signal or an "off" signal, i.e. according as it is conductor 146 or conductor 147 which becomes energized upon transmission of a satisfactory start pulse.

The on circuits relay or the off circuits relay effects energization of those of the cycling device input conductors 66 to 70 as are required by the identity and number of the circuit selection conductors 141 to 145 which have been energized in the circuit selection network 176 of FIGS. 1*c* and 1*d*.

To this end the cycling device input conductors 61 to 71 are extended into each of the activating units as conductors identified in FIGS. 1*g* and 1*i* at 61*a* to 71*a*. Each of the conductors 61*a* to 65*a* of each activating unit connects therein to one side of each of five of the normally open pairs of contacts on each of the two group control relays of that unit—contacts 281–1 to 281–5 in the case of relay 281. The input side of the ones of these contact pairs corresponding to those of pulses A to E to be developed with the aid of that group control relay are connected together through a conductor (101*b* for relay 281) and thence through a manually operable group disconnecting switch 282 to the extension into the unit of the group selection conductor—extension 101*a* for relay 281. Since relay 281 is to cause generation of all of pulses A to E, the input side of each of its contact pairs 281–1 to 281–5 is connected to conductor 101*b*. Since relay 291, energizable from the group two group selection conductor 102*b*, is to cause generation only of pulses A to D, the input side of its pair of contacts 291–5 is open circuited.

Each of the conductors 66*a* to 70*a* connects in each activating unit with one side of one pair of the contacts on each of the two on circuit and two off circuit relays of that unit.

It is to be noted that on the group control relay contact pairs —1 to —5, connections are provided to complete the circuit upon energization of such group control relay from the incoming group selection conductor (101*b* in the case of relay 281) to only those of conductors 61*a* to 65*a* as lead in the cycling device 48 to switches on those of cams 52–A to 52–E which develop those of the A to E pulses appurtenant to such group control relay. It is in this way that the group control relays are coded, and in this respect the various group control relays differ from each other. In other respects the sixteen input line activating units of the embodiment illustrated may be regarded as containing thirty-two identical sets of components.

The cycling device is set into operation by closing of the —7 contact pair on the selected group control relay when that relay is energized. Conductor 51 leading in the cycling device to the ungrounded terminal of the shift motor 50 is extended as a conductor 51*a* into each of the cycling device input line activating units such as 256, and there connects with one side of the —7 contact pair on each of the two group control relays of that unit, the other side of the —7 contact pairs connecting with bus 80. As soon as motor 50 starts by energization of the line 51*a*, the 52-hold cam in the cycling device connects conductor 51 to the conductor 72.

Since the input conductor 72 of the cycling device is connected permanently, as through a conductor 72*a* in the unit 256 shown, to the energized conductor 80, starting of the cycling device shift motor 50 results in operation of that motor through a complete cycle and the automatic delivery to transmitter 1 via conductor 54 of a start pulse and of those of the A to E pulses for which the group control relays so starting the cycling device is coded.

In each of the cycling device input line activating units such as unit 256, each of the five of the circuit selection conductors 141 to 145 is connected to one side of a contact pair on each of the circuit relays of that unit. Referring to unit 256 illustrated, each of the extensions 141*a* to 145*a* of conductors 141 to 145 is passed, through separate individual manually operable switch 298 to two separate extensions 141*a*–1 and 141*a*–2. Conductor 141*a*–1 leads to one side of the —2 contact pair on each of relays 283 and 285 controlled by relay 281. Conductor 141*a*–2 leads to one side of the —2 contact pair on each of relays 293 and 295 controlled by relay 291.

In similar manner, connections are provided leading from each of conductors 142 to 145 to one side of the —3 to —6 contact pairs on all of the on circuit and off circuit relays of the system. Opening of a switch 298 serves to insulate a particular load device from the control system of the invention by preventing generation of its one of the circuit identification pulses F to J in signals containing the group code combination of pulses A to E to which that load device responds.

The on circuit and off circuit relays of each group are controlled from conductors 146 and 147 respectively through the —8 and —9 contact pairs of the group control relay of such group. Thus, in relay 281, the input side of contact pairs 281–9 and 281–8 connect respectively to conductors 146*a* and 147*a*. The output sides of contact pairs 281–9 and 281–8 respectively lead via conductors 300 and 302 to the ungrounded terminals of the shift motors of the on and off circuit relays 283 and 285.

The —10 contact pair on each of the group control relays is used to provide the shift motor of that relay with a holding circuit to the energized bus 80.

Connection is also provided in each group control relay from conductor 147 (147*a* for relay 281) to the input side of the —6 contact pair of the group control relay, the output side of that pair connecting with conductor 71 in the cycling device for development of an Off pulse if conductor 147 is energized.

From the foregoing it will be understood that the energization of conductors 101, 141 and 151 which resulted from the assumed arrangement of pins in the program instruments for the minute time interval at 14:52 hours on Tuesday has energized relay 281, has set the cycling device 48 in operation and has caused the transmitter to develop, at *f*1 frequency, the pulses Start A B C D E. Assuming positive verification of this Start pulse, line 146*a* is immediately energized, and this effects energization of relay 283 through contact pair 281–9 of relay 281.

Each of the on circuit and off circuit relays such as relays 283, 285, 293 and 295 has twelve pairs of normally open contacts —1 to —12, driven together. The topmost or —1 pair on all on circuit relays are connected in parallel so that energization of any on circuit relay energizes an "on" indicator lamp 304 (FIG. 1*k*) via conductor 306. Similarly the —1 contacts on all off circuit relays control energization of an "off" indicator lamp 308 via a conductor 310.

The input sides of the —2 to —11 pairs are connected together in pairs, —2 to —7, —3 to —8 and so on, and the input sides of the —2 to —6 pairs are connected, via the switches 298, to the conductors 141 to 145 respectively at the extensions thereof in each unit, identified at 14*a* to 145*a* in unit 256. The output sides of the —2 to —6 pairs connect respectively, via the extensions thereof such as 66*a* to 70*a* in unit 256, with the cycling device input conductors 66 to 70. The output sides of the —7 to —11 pairs on each on circuit relay connect each to a stationary contact 398 of one of five motor driven latch relays, shown at 287–1 to 287–5 for the on circuits relay 283 controlled by the group one group control relay 281. The output sides of the —7 to —11 pairs on the associated off circuit relay connect each to a contact 396 on those same latch relays, the output sides of contacts 285–7 to 285–11 of off circuit relay 285 thus connecting to contact 396 on latch relays 287–1 to 287–5 which are provided to indicate the status of the group one circuits.

Each of these latch relays includes a shift motor 400 and three cams 402, 404 and 406 coupled thereto to form an assembly like that of motor 221 and cams 220, 222 and 223 of FIG. 4.

Cams 402 and 406 have three teeth of 60° width separated from each other by 60° notches. As cam 402 rotates it drives a movable contact 397 to engagement first with fixed contact 396 and then with fixed contact 398. The movable contact 397 connects with the ungrounded side of the relay shift motor 400.

Cam 404 has six 30° teeth 30° apart, and drives therewith a movable contact 408, also connecting with the ungrounded side of motor 400, into and out of engagement with a fixed contact 410 which is connected to the bus 80.

Cam 406 drives a movable contact 412, connected to the lamp circuit conductor 280, into and out of engagement with a fixed contact 414 which connects with one terminal of an indicator lamp, identified at 416–1 for latch relay 287–1, the other terminal of which connects with the other lamp circuit conductor 278.

All three of the cams 402, 404 and 406 are driven at the same angular speed. Cams 402 and 406 are so phased that cam 406 completes the circuit for lamp 416 when cam 402 connects the motor 400 to the "off" contact 396, leading to the off circuit relay 285. On the other hand when cam 400 connects contacts 397 and 398 together, cam 406 separates contacts 412 and 414 to leave lamp 416 de-energized. Cam 404 is so phased with respect to the other two that its teeth are astride the edges of the teeth on the other two. When the motor 400, such as that of latch relay 416–1 say, is energized at its contact 398 by voltage from circuit conductor 141 arriving via an on circuit relay 283, contact 398 being closed to contact 397 when motor 400 starts to turn, a parallel energizing circuit is made for the motor at contacts 408 and 410 before the circuit is broken at contacts 397 and 398 so that the motor continues to rotate until it interrupts the circuit at contacts 408 and 410. Before contacts 408 and 410 are separated, contact 397 is closed to contact 396, so that motor 400 can be started again only by on "off" signal connecting circuit conductor 141 to contact 396 through off circuit relay 285.

The indicator lamps 416 show by group number and by circuit number or numbers the nature of the signal being sent out and remain illuminated, if the signal includes a command to their circuit, after the signal has been sent out and until the transmission of another signal is initiated.

It will be observed that five lamps 416 are provided for each group control relay, one for each of the five circuit pulses E to F which may accompany the combination of A to E pulses generated by that group control relay. There are thus, for the embodiment of the invention illustrated, one hundred and sixty-two lamps 416, each identifiable with one of the thirty-two A to E pulse codes which the apparatus is capable of generating and with one of the five circuit pulses F to J. These lamps may be assembled in any convenient location in a suitable array.

The apparatus of FIG. 1 includes means whereby at any time, subject to completion of a signal initiated at the program instruments and already in process of generation, control of the group, circuit, On, Off and frequency conductors 101–132, 141–145, 146, 147 and 151–154 may be taken away from the program instruments and subjected to manual operation instead.

The manual control section provided for this purpose is shown in FIGS. 1*k* and 1L. In this section a frequency selection is made by operation of a five position switch 450, the stationary contacts F1, F2, F3, F4 of one deck of which connect respectively with conductors 151 to 154. The movable contact 452 of this deck is connected to a conductor 454 energized in a manner to be described presently. A second deck of switch 450 ganged with the first provides control for indicator lamps 456.

A five position switch 458 with a movable contact 460 connected to conductor 454 is provided for selection of the tens digit of the group conductor desired. The four fixed contacts of the deck of this switch including contact 460 lead via conductors 461 to 464 to the movable contacts of four eleven-position switches identified at reference characters 465 to 468 respectively. A second deck of switch 458 controls four tens digit indicator lamps 459.

Switch 465 has nine stationary contacts, connecting with conductors 101 to 109 respectively. Switches 466 and 467 have ten stationary contacts each, connecting with conductors 110 to 119 in the first case and 120 to 129 in the second case. Switch 468 has three stationary contacts, connecting with conductors 130 to 132. An eleven-position switch 469 is provided, arranged to be mechanically coupled with whichever one of switches 465 to 468 is being operated, for control of ten indicator lamps 470.

Manual circuit selection is effected at five switches 476 to 480. Each of these has one pair of contacts which when closed, connects conductor 454 to one of the circuit selection conductors 141 to 145. Each switch has a second pair of contacts for control of an indicator lamp 482.

Make-up of the signal to be transmitted is completed by operation of the manual "cycle switch" 191 already mentioned to either an On or an Off closed position. In On or Off closed position this switch energizes the corresponding one of conductors 188 and 190. This operation energizes the corresponding one of the motors 180 and 182. The contacts of the lowest pair 418 of cam driven contact pairs on the energized one of these motors, normally open, are closed to provide a holding circuit for the motor as soon as it is energized. The next pair 420, also normally open, are closed to connect conductors 196 and 100 together. This energizes time delay motor 198. The third pair of contacts 422, also normally open, close to connect conductors 254 and 454, conductor 254 being substantially simultaneously energized by connection to conductor 98 due to operation of cam 252 coupled to motor 198.

The fourth pair of contacts 424 of the energized motor 180 or 182, normally closed, is opened to prevent energization of conductor 172 and consequent set-up of a signal by operation of the program instruments until the manual selection and transmission is completed. The fifth pair 426, normally open, is closed to energize the corresponding one of conductors **258*a* and 260*a* from conductor 254. The sixth and seventh pairs 428 and 430, normally closed, are opened to insulate conductors 258*a* and 260*a* from conductors 258 and 260, and the eighth pair 432, normally closed, is opened to prevent operation of start motor 184** in response to the possible making of contact at drums 28–On and 28–Off.

The consequence of the foregoing is that a conductor selected from each of the pluralities 101–132, 141–145, 151–154, and **258*a*, 260*a*** has been energized. The remainder of the operation proceeds exactly as in the case of energization of four such conductors by operation of the program instruments.

To return briefly to description of the automatic operation of the system, it will be clear from FIG. 1*c* that program drums 28–A to 28–E provide means for energizing, at any minute interval, any combination of five relays each of which comprises the motor 94 associated with one of those drums, the cam driven by that motor, and the vertical column of contacts operated by that cam shown above it. The relay contacts of interest are enclosed in dash line box 174, and make up a binary network of relay contacts interconnected to connect an input connector 172 to any one of thirty-two output group selection conductors 101 to 132, one for each combination of energized and deenergized states of the five relays.

From FIGS. 1*c* and 1*d* it will likewise be clear that drums 28–F to 28–J provide means for energizing, at any minute interval, five additional relays each of which comprises the motor 92 controlled by one of those drums, its cam 94, and the vertical column of contacts above such cam which are operated by it. The relay contacts of interest are those enclosed in the dash line box 176, and these include for each of these five circuit selecting relays a pair of contacts which for one state of energization of such relay connect one input conductor 172 to a separate one of five output circuit conductors 141 to 145.

The motor, cam, and cam operated contacts associated with each of the drums 28–I to 28–IV, 28–On, 28–Off, 28–F′ and 28–F″ similarly constitute in each case a relay. In the case of the relays thus associated with drums 28–On and 28–Off, the contacts enclosed in dash line box 167 form a network connecting an input conductor 171 to one of two output conductors 258 and 260 for separate energization of each of the two relays.

While the invention has been described hereinabove in terms of a preferred embodiment, various modifications may be made in the structure shown without departing from the scope of the invention itself, which is set forth in the appended claims.

For example, the number of code pulses is variable, and so is their distribution among group selection and circuit selection pulses. Other means than the drum type program instruments shown in FIG. 6 may be used to activate the various code pulse, frequency, and On, Off relays. Thus loops of perforated tape may be used for this purpose.

The number of different frequencies provided is also subject to variation, the invention not requiring the provision of more than one frequency. The invention is in particular applicable to wired synchronous systems wherein, in place of pulses of carrier frequency distributed over the power circuits of the load devices, pulses of any desired frequency, including direct current, are applied between ground and a distribution conductor, provided for the purpose. Such a distribution conductor may connect directly to the ungrounded terminal of the activating coil of the relay 208 of FIG. 3, tube 207 being dispersed with.

The relays 46*f*1 to 46*f*4 of FIG. 1 can in such a system select among plural third wires of the type just described.

Program instruments of the type illustrated in FIG. 6 are further described in U.S. Patent No. 2,711,790. Coded relay apparatus of the type illustrated in FIG. 3 is described in the copending application of Andrew Craig Reynolds, Jr., Serial Number 756,566, filed August 22, 1958 for "Binary Code Relay." Latching relay apparatus of the type illustrated in FIG. 4 is described in the copending application of Andrew Craig Reynolds, Jr., Serial Number 682,935, filed September 9, 1957 for "Latching Motor Relay."

I claim:

1. A signal generating apparatus comprising a first plurality of relays having contacts thereon interconnected through a switching network leading upon each of a plurality of combinations of energized and de-energized states of said relays from an input conductor to a separate outgoing group selection conductor, a second plurality of relays each having contacts leading for one state of energization of such relay from an input conductor to a separate outgoing circuit selection conductor, means to energize said relays in a plurality of combinations at any of a plurality of time intervals, a pair of relays each having contacts thereon leading upon energization thereof from an input conductor to one of two function determining conductors, means to energize either relay of said pair at any of said time intervals, a first and a second plurality of switches equal in number respectively to said first and second named pluralities of relays, a cyclically operable driving means for said switches coupled together and to said switches to close the same in a cyclical succession, a third plurality of group control relays responsive each to connection of one of said group selection conductors to said first named input conductor to complete a circuit in parallel with the contacts of each switch of a separate combination of said first plurality of switches, a fourth plurality of circuit relays, including two relays for each of said group control relays, each relay of said fourth plurality of relays being energizable via an energized one of said group control relays and via one of said function determining conductors, each relay of said fourth plurality connecting when energized each of said circuit conductors into a circuit with the contacts of one switch of said second plurality of switches, all of said circuits in parallel with the contacts of said first and second pluralities of switches including a common signal generating means.

2. A signal generating apparatus according to claim 1 including a further switch coupled to said driving means to be cyclically closed thereby, and means connecting said last-named switch via a pair of contacts on each of said group control relays into a circuit including said signal generating means and one of said function determining conductors.

3. A signal generating apparatus according to claim 1 including a further switch coupled to said driving means to be cyclically closed thereby in advance of any of the other of said switches, and means for completing a circuit in parallel with the contacts of said last-named switch through each of said group control relays, said last-named circuit including said signal generating means.

4. The combination of claim 1 and a threshold relay responsive to signals developed by said signal generating means exceeding a predetermined minimum dimension, said threshold relay having a separate pair of contacts in series with each of said function determining conductors.

5. In a circuit control apparatus having a plurality of circuit controlling receiving stations responsive to combintions of a multiple pulse code, a central station adapted to generate said pulse code, and a transmission channel between said central station and each of said receiving stations; signal generating apparatus at said central station comprising, in combination, storage means for temporary storage of a preselected combination code to be transmitted during a given interval of time, decoding means at said central station connected to said temporary storage means and adapted to effect connection of one of a plurality of group selection circuits corresponding to the preselected combination stored, manually actuated means at said central station adapted to effect connection or disconnection of each of said group selection circuits, re-encoding transmission means adapted to be actuated by a connected one of said group selection circuits to effect transmission of said preselected combination code only when said manually-actuated means has effected connection of said one group selection circuit.

6. The combination of claim 5 and time synchronized code storage means adapted to effect storage of said preselected combination code in said temporary storage means at a predetermined instant of time.

7. The combination of claim 5 in which said re-encoding transmission means is adapted to transmit said preselected combination code serially in time.

8. The combination of claim 5 in which said temporary storage means is also adapted to store a preselected function selection and to effect connection of a corresponding one of a plurality of function selection circuits, said re-encoding transmission means controllable by said one function selection circuit so as to transmit a preselected function code corresponding to said preselected function selection together with said preselected combination code, and means actuated by said one group selection circuit and said one function selection circuit to indicate until the next transmission of said preselected combination code the corresponding function selected for said one group selection circuit.

9. The combination of claim 5 and manually operable means adapted to effect connection of a selected one of said group selection circuits for manually actuated transmission of the corresponding combination code.

10. The combination of claim 5 in which each of said receiving stations comprises a pulse code responsive relay for energizing a control circuit upon receipt of its combination code.

11. The combination of claim 10 in which said control circuit comprises a latching relay.

12. The combination of claim 5 in which said temporary storage means is also adapted to store preselected circuit selection information and to effect connection of corresponding ones of a plurality of circuit selection circuits, a plurality of subgroup circuit selection circuits, connection of selected ones of said subgroup circuits being effected by said group and circuit selection circuits, manually actuated means adapted to effect connection or disconnection of said subgroup circuits, said re-encoding means controllable by said manually actuated means, to transmit a preselected circuit code corresponding to said preselected circuits together with said preselected combination code.

13. The combination of claim 12 in which said re-encoding transmission means is adapted to transmit said preselected combination and circuit selection codes serially in time.

14. The combination of claim 12 in which said temporary storage means is also adapted to store a preselected function selection and to effect connection of a corresponding one of a plurality of function selection circuits, said re-encoding transmission means controllable by said one function selection circuit so as to transmit a preselected function code corresponding to said preselected function selection together with said preselected combination and circuit selection codes and means actuated by said one group selection circuit, said ones of said subgroup circuits and said one function selection circuit to indicate until the next transmission of said preselected combination code together with appropriate circuit selection codes the corresponding function selected for said ones of said subgroup circuits.

15. The combination of claim 12 and manually operable means adapted to effect connection of a selected one of said group selection circuits and selected ones of said circuit selection circuits for manually actuated transmission of the corresponding combination and circuit selection codes.

16. The combination of claim 5 and permanent code storage means comprising a plurality of simultaneously driven program drums, a switch adjacent each of said drums and having a first contact thereof connected to said temporary storage means and a second contact thereof connected to a source of energization, said drums adapted to close selected combinations of said switches at each interval of a multiple interval time cycle to connect said source of energization to said temporary storage means to effect therein storage of preselected combination codes at preselected intervals of said cycle.

17. The combination of claim 16 and a plurality of scheduling drums; said scheduling drums each comprising an interval drum, a calendar cam and a pair of switches in series actuated thereby; a first switch of said pair actuated by said interval drum and selectively closeable at each interval of said time cycle, a second switch of said pair actuated by said calendar cam and selectively closeable by said cam during each of a plurality of said cycles, and means controlled by the closing of one of said pairs of switches to connect said source of energization to said program drums.

18. The combination of claim 17 in which said last named means is adapted to connect said source of energization to said program drums when one and only one of said pairs of switches are closed.

19. The combination of claim 16 and scheduling means interposed between said source of energization and said program drums adapted to connect said source to said drums at preselected ones of said intervals for a period of time including a plurality of said time cycles.

20. In a circuit control system adapted to actuate a plurality of circuit controlling receiving stations responsive to a time sequential pulse coded signal consisting of an all start pulse followed by group and circuit selection multiple pulse intervals and a function pulse interval to turn on or off devices controlled thereby, a transmitting station adapted to generate preselected pulse coded signals of the designated character, comprising in combination, a plurality of simultaneously driven binary information storage drums, said drums including a plurality of group and circuit control members equal in number to said group and circuit pulse intervals respectively, and at least one function control member; binary coded information stored in said drums and adapted to actuate preselected ones of said members at preselected intervals of time, one of said members actuated by each of said drums, a plurality of time delay relays, one of said time delay relays controlled by each of said members, and said relays adapted to store said binary information until effective transmission thereof to said receiving stations; a group selection network connected to and actuated by said time delay relays controlled by said group control members, said network adapted to condition for energization, one of a plurality of group selection conductors for each combination of binary group information stored in said group drums, said time delay relays which are controlled by said circuit control members being adapted to condition for energization selected ones of a plurality of circuit selection conductors corresponding to the binary information stored in said circuit drums, said time delay relays which are controlled by said function control members being adapted to condition for energization one of two function selection conductors, and means for energizing said conditioned group, circuit and function conductors.

21. The combination of claim 20 and time sequential pulse code transmission means controlled by said energized group, circuit and function selection conductors, to transmit an all start pulse followed by a combination of possible group selection pulses corresponding to the energized one of said group selection conductors and circuit selection pulses corresponding to the energized ones of said circuit selection conductors; and to transmit a function pulse when a particular one of said two function selection conductors is energized.

22. The combination of claim 21 further defined in that said transmission means includes verification means adapted to receive said all start pulse and responsive thereto to prevent effective transmission of said pulse coded signal when said all start pulse is not of a minimum amplitude and duration.

23. The combination of claim 20 and a plurality of subgroup circuit selection conductors divided into groups of conductors, each group corresponding to one of said group selection conductors and containing subgroup conductors equal in number to the number of said circuit selection conductors, and means for energizing said subgroup conductors when their respective circuit conductors are energized.

24. The combination of claim 23 and manually actuated switches for selectively preventing the energization of each of said group and subgroup selection conductors by said energization means irrespective of the status of said time delay relays.

25. The combination of claim 24 and time sequential pulse code transmission means controlled by said energized group, subgroup and function selection conductors; to transmit an all start pulse followed by a combination of possible group selection pulses corresponding to the energized one of said group selection conductors and circuit selection pulses corresponding to the energized ones of said subgroup selection conductors corresponding to said energized group selection conductor; said transmission means also adapted to transmit a function pulse when a particular one of said two function selection conductors is energized and only when the group and subgroup selection conductors associated with said group and circuit selection pulses are energized by said manually actuated switches.

26. The combination of claim 23 and two function-subgroup conductors corresponding to each of said subgroup conductors, and relay means adapted to energize one of said function-subgroup conductors when its respective function and subgroup conductors are energized.

27. The combination of claim 26 and a plurality of latching relays controlled by said function-subgroup conductors and adapted to energize indicator circuits indicative of the last function signal transmitted to receiving stations responsive to the respective group and circuit selection pulses corresponding to said energized function-subgroup conductors.

28. The combination of claim 21 and manually actuated switching means adapted to effect energization of a selected one of each of said group and function selection conductors and of selected ones of said circuit selection conductors to manually transmit a selected coded signal.

29. The combination of claim 20 in which said energization means includes a source of energization and means for connecting said source to said conditioned conductors at selected intervals of time.

30. The combination of claim 29 further defined in that there are two function control members corresponding to on and off function pulses respectively and in which said time delay relays controlled by said function control members also control said connecting means to connect said conditioned conductors to said energization source only when one and only one of said function control members is actuated by said function drums.

31. The combination of claim 20 and a plurality of schedule control members adapted to be actuated by said drums at preselected intervals of time, a plurality of calendar control members adapted to be actuated by calendar cams during preselected pluralities of said intervals, said calendar cams driven in synchronism with said drums, said calendar and schedule control members associated together in pairs, a source of energization, said energization means controllable by each of said pairs of members and adapted to connect said source of energization to said conditioned conductors when both of a pair of said members are actuated by said drums and cams.

32. The combination of claim 31 further defined in that said energization means is adapted to connect said source of energization to said conditioned conductors only when one and only one of said pairs of members are actuated.

33. The combination of claim 32 further defined in that there are two function control members corresponding to on and off function pulses respectively and in which said energization means is also controlled by said time delay relays controlled by said function control members and is adapted to connect said source of energization to said conditioned conductors only when one and only one of said function control members is actuated by said function drums.

References Cited in the file of this patent

UNITED STATES PATENTS

| | | |
|---|---|---|
| 1,577,515 | Bonell | Mar. 23, 1926 |
| 2,580,787 | Johnson | Jan. 1, 1952 |
| 2,799,811 | Lindars | July 16, 1957 |
| 2,845,616 | Lester | July 29, 1958 |

UNITED STATES PATENT OFFICE

CERTIFICATE OF CORRECTION

Patent No. 2,997,702 August 22, 1961

Andrew Craig Reynolds, Jr.

It is hereby certified that error appears in the above numbered patent requiring correction and that the said Letters Patent should read as corrected below.

Column 2, line 49, for "A.-C." read -- A.C. --; column 5, line 52, for "ABC$\bar{E}\bar{D}$F" read -- ABC$\bar{D}\bar{E}$F --; column 10, line 52, for "quetion" read -- question --; line 69, for "ocmbination" read -- combination --; column 11, line 9, for "268a" read -- 258a --; line 18, for "vertifier" read -- verifier --.

Signed and sealed this 6th day of February 1962.

(SEAL)

Attest:

ERNEST W. SWIDER
Attesting Officer

DAVID L. LADD
Commissioner of Patents